US012057071B2

(12) United States Patent
Kim et al.

(10) Patent No.: US 12,057,071 B2
(45) Date of Patent: Aug. 6, 2024

(54) DISPLAY DEVICE AND METHOD FOR DRIVING PIXEL OF THE SAME

(71) Applicants: LG Display Co., Ltd., Seoul (KR); Industry-University Cooperation Foundation Hanyang University, Seoul (KR)

(72) Inventors: Harkjin Kim, Incheon (KR); Kwanghwan Ji, Incheon (KR); Byong-Deok Choi, Seoul (KR); Bum Sik Kim, Suwon-si (KR); Dong-Young Kim, Paju-si (KR); Yong Duck Kim, Seoul (KR); June Hee Lee, Paju-si (KR)

(73) Assignees: LG Display Co., Ltd., Seoul (KR); INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 0 days.

(21) Appl. No.: 18/219,544

(22) Filed: Jul. 7, 2023

(65) Prior Publication Data

US 2024/0029651 A1 Jan. 25, 2024

(30) Foreign Application Priority Data

Jul. 14, 2022 (KR) ........................ 10-2022-0087126

(51) Int. Cl.
*G09G 3/32* (2016.01)
*G09G 3/3233* (2016.01)
(Continued)

(52) U.S. Cl.
CPC ......... *G09G 3/3233* (2013.01); *G09G 3/3266* (2013.01); *G09G 3/3291* (2013.01); *G09G 2300/0842* (2013.01); *G09G 2310/08* (2013.01)

(58) Field of Classification Search
CPC .. G09G 3/3233; G09G 3/3266; G09G 3/3291; G09G 2300/0842; G09G 2310/08; G09G 3/006; G09G 3/325
(Continued)

(56) References Cited

U.S. PATENT DOCUMENTS 10,978,001 B2 4/2021 In et al.
2014/0022289 A1 * 1/2014 Lee ........................ G09G 3/006 345/76

(Continued)

FOREIGN PATENT DOCUMENTS

KR 10-2020-0037893 A 4/2020
KR 10-2020-0078995 A 7/2020

*Primary Examiner* — Abdul-Samad A Adediran
(74) *Attorney, Agent, or Firm* — Fenwick & West LLP

(57) ABSTRACT

Disclosed are a display device and a method for driving a pixel of the display device. The device and method is capable of securing a time to sense a threshold voltage of a driving transistor and of compensating for the threshold voltage during operation of the pixel. Each of a plurality of pixels has a 5T1C structure including first to fourth transistors and a driving transistor. The first to fourth transistors are configured to apply driving signals through first to fourth scan lines, respectively. Thus, even without increasing the number of driving signals applied to each pixel, a long time for sensing a threshold voltage of each pixel can be secured.

24 Claims, 24 Drawing Sheets

(51) Int. Cl.
*G09G 3/3266* (2016.01)
*G09G 3/3291* (2016.01)

(58) Field of Classification Search
USPC ........................................................ 345/76, 82
See application file for complete search history.

(56) References Cited

U.S. PATENT DOCUMENTS

| | | | | |
|---|---|---|---|---|
| 2016/0005384 | A1* | 1/2016 | Yoon | G09G 3/3291 345/82 |
| 2018/0197462 | A1* | 7/2018 | Nagayama | G09G 3/325 |
| 2020/0105199 | A1 | 4/2020 | In et al. | |
| 2021/0201759 | A1* | 7/2021 | Cho | G09G 3/3233 |

* cited by examiner

DISPLAY DEVICE AND METHOD FOR DRIVING PIXEL OF THE SAME

CROSS-REFERENCE TO RELATED APPLICATION

This application claims priority from Republic of Korea Patent Application No. 10-2022-0087126 filed on Jul. 14, 2022 in the Korean Intellectual Property Office, which is incorporated by reference in its entirety.

BACKGROUND

Field

The present disclosure relates to a display device and a method for driving a pixel thereof, and more particularly, for example, without limitation, to a display device and a method for driving a pixel thereof capable of securing a sensing time of a threshold voltage of a driving transistor during pixel operation.

Description of Related Art

An organic light-emitting diode (OLED) is a self-light-emitting element that includes an anode electrode and a cathode electrode, and an organic compound layer formed therebetween. The organic compound layer is composed of a hole transport layer (HTL), a light-emissive layer (EML), and an electron transport layer (ETL).

When a driving voltage is applied to the anode electrode and the cathode electrode, holes that have passed through the hole transport layer (HTL) and electrons that have passed through the electron transport layer (ETL) move to the light-emissive layer EML and are combined with each other to form excitons. As a result, the light-emissive layer EML generates visible light.

An active-matrix type organic light-emitting display device includes an organic light-emitting element (organic light emitting diode OLED) that emits light by itself, and is used in various ways due to fast response speed, high luminous efficiency high luminance, and wide viewing angle thereof.

In the organic light-emitting display device, pixels each including an organic light-emitting element are arranged in a matrix form. Luminance of the pixels are adjusted according to gradation of video data. Each of the pixels includes an organic light-emitting element, a driving transistor that controls the driving current flowing through the organic light-emitting element according to a difference between voltages of the gate and the source, and at least one switch transistor that programs the voltage difference between the voltages of the gate and the source of the driving transistor. A pixel circuit including an organic light-emitting element, a driving transistor, and at least one or more switch transistors operates according to a scan signal and a light-emission signal.

Accordingly, the pixel circuit supplies the driving current to the organic light-emitting element according to the scan signal and the light-emission signal. In this regard, a driving signal of the pixel circuit secures a time for sensing a threshold voltage using a continuous signal of n-H time such as, for example, four horizontal periods (4H). In this regard, as n increases, a compensation rate for the threshold voltage increases. Thus, a minimum of 4H and a maximum of 16H are required.

When a duty ratio is 50%, a signal of the 4H time requires 8 signal waveforms, and a signal of the 16H time requires 32 signal waveforms. That is, there is a problem in that the number of signals input to a pixel increases as n increases.

SUMMARY

The inventors have recognized requirements described above and other limitations associated with the related art. Thus, in order to solve the above-described problem, the inventors of the present disclosure have invented a display device capable of securing a sensing time of a threshold voltage of a driving transistor when driving each pixel in an OLED display device.

Another purpose of the present disclosure is to provide a method for driving a pixel of a display device capable of securing a time to sense the threshold voltage of the driving transistor and of compensating for the threshold voltage when a gate driver of the display device applies a scan signal to a pixel of an organic light-emitting diode to drive the pixel.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims or combinations thereof.

A display device according to one embodiment of the present disclosure may be provided. The display device may include a display panel in which a plurality of pixels are disposed; a gate driver configured to supply a scan signal to each of the plurality of pixels; a data driver configured to supply a data voltage to each of the plurality of pixels; a light-emission signal supply configured to supply a light-emission signal to each of the plurality of pixels; and a timing controller configured to control the gate driver, the data driver, and the light-emission signal supply, wherein each of the plurality of pixels includes: an organic light-emitting element configured to emit light based on a driving current; a driving transistor configured to control the driving current, and including a first electrode as a first node, a gate electrode as a second node, and a second electrode as a third node; a first transistor including a first gate electrode connected to a first scan signal line transmitting a first scan signal; a second transistor including a second gate electrode connected to a second scan signal line transmitting a second scan signal; a third transistor including a third gate electrode connected to a third scan signal line transmitting a third scan signal; a fourth transistor including a fourth gate electrode connected to a fourth scan signal line transmitting a fourth scan signal; and a storage capacitor connecting the second node and the third node to each other.

A method for driving a pixel of a display device may be provided. The method may include, during a threshold voltage sensing period of each of the plurality of pixels, (a) outputting, by the gate driver, the first scan signal of a high-level and the second scan signal of a high-level simultaneously and in an overlapping manner to each of the plurality of pixels; (b) applying the first scan signal of the high-level to the first gate electrode to turn on the first transistor, and applying the second scan signal of the high-level to the second gate electrode to turn on the second transistor; (c) applying a first reference voltage to the gate electrode of the driving transistor through the first transistor and the second transistor; and (d) compensating for a threshold voltage of the driving transistor.

Details of other embodiments are included in the detailed description and drawings.

According to the embodiments of the present disclosure, even though the number of driving signals applied to each pixel is not increased when the gate driver of the display device applies the driving signal to each pixel to drive the pixel, a long time for sensing the threshold voltage of each pixel may be secured.

Therefore, according to the embodiment of the present disclosure, sufficient time for sensing the threshold voltage of each pixel may be secured such that the compensation rate for the threshold voltage of each pixel may be increased.

Moreover, according to the embodiment of the present disclosure, sufficient time for sensing the threshold voltage of each pixel may be secured such that the number of external clock signals for each pixel in the display panel may not be increased.

Moreover, according to the embodiment of the present disclosure, the number of external clock signals for each pixel in the display panel may not be increased such that a thickness of the bezel may be reduced, and a control burden of the timing controller may be reduced.

Further, according to the embodiment of the present disclosure, the number of external clock signals for each pixel in the display panel may not be increased and the thickness of the bezel may be reduced, such that the GIP circuit of the display device may be implemented in a simple manner.

Effects of the present disclosure are not limited to the effects mentioned above, and other effects not mentioned will be clearly understood by those skilled in the art from the description below.

In addition to the above effects, specific effects of the present disclosure are described together while describing specific details for carrying out the present disclosure.

BRIEF DESCRIPTION OF DRAWINGS

The above and other objects, features and other advantages of the present disclosure will be more clearly understood from the following detailed description taken in conjunction with the accompanying drawings, in which.

Figure 1:
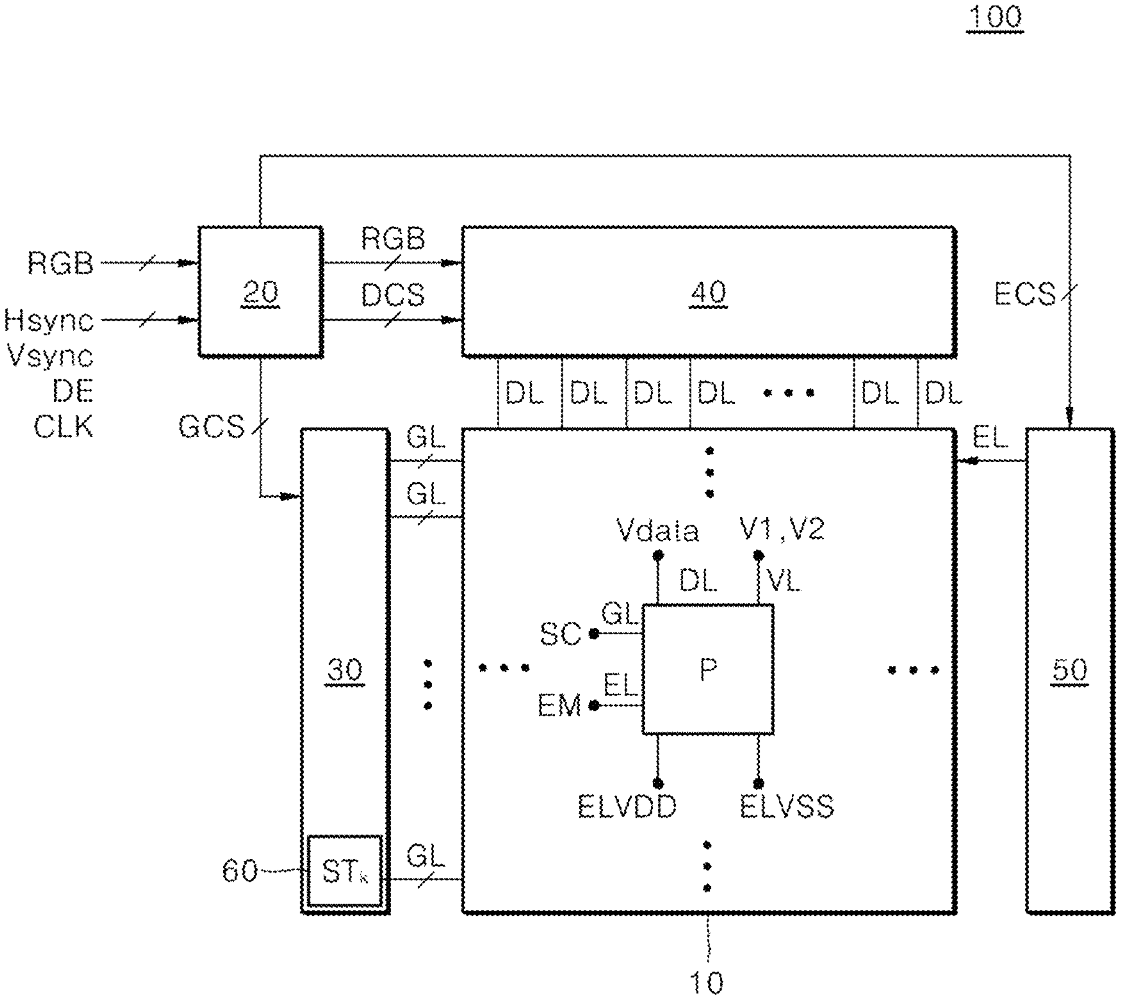
FIG. 1 is a block diagram schematically illustrating a display device according to an exemplary embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Advantages and features of the present disclosure, and a method of achieving the advantages and features will become apparent with reference to embodiments described later in detail together with the accompanying drawings. However, the present disclosure is not limited to the embodiments as disclosed under, but may be implemented in various different forms. Thus, these embodiments are set forth only to make the present disclosure complete, and to completely inform the scope of the present disclosure to those of ordinary skill in the technical field to which the present disclosure belongs, and the present disclosure is only defined by the scope of the claims.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for describing embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms such as "include," "have," "comprise," "contain," "constitute," "make up of," "formed of," and "including" when used in this specification, specify the presence of the stated features, integers, operations, elements, and/or components, but do not preclude the presence or addition of one or more other features, integers, operations, elements, components, and/or portions thereof, unless the terms are used with the term such as "only". As used herein, the term "and/or" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

When the position relation between two parts is described using the terms such as "on", "above", "over", "below", "under", "beside", "beneath", "near", "close to," "adjacent to", "on a side of", "next" or the like, one or more parts may be positioned between the two parts unless the terms are used with the term such as "immediately" or "directly".

Spatially relative terms, such as "under," "below," "beneath", "lower," "over," "upper" and the like, may be used herein for ease of description to describe one element or feature's relationship to another element(s) or feature(s) as illustrated in the figures. It will be understood that the spatially relative terms can encompass different orientations of an element in use or operation in addition to the orientation depicted in the figures. For example, if an element in the figures is inverted, elements described as "below" or "beneath" other elements or features would then be oriented "over" the other elements or features. Thus, the exemplary term "below" can encompass both an orientation of below and above. Similarly, the exemplary term "above" or "over" can encompass both an orientation of "above" and "below".

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after", "following", "subsequent to", "before", etc., another event may occur therebetween unless "directly after", "directly following", "directly subsequent" or "directly before" is not indicated.

When a certain embodiment may be implemented differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described under could be termed a second element, component, region, layer or section, without departing from the spirit and scope of the present disclosure.

The features of the various embodiments of the present disclosure may be partially or entirely combined with each other, and may be technically associated with each other or operate with each other. The embodiments may be implemented independently of each other and may be implemented together in an association relationship.

In interpreting a numerical value, the value is interpreted as including an error range unless there is no separate explicit description thereof.

It will be understood that when an element or layer is referred to as being "connected to", or "connected to" another element or layer, it may be directly on, connected to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

The features of the various embodiments of the present disclosure may be partially or entirely combined with each other, and may be technically associated with each other or operate with each other. The embodiments may be implemented independently of each other and may be implemented together in an association relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "embodiments," "examples," "aspects, and the like should not be construed such that any aspect or design as described is superior to or advantageous over other aspects or designs.

Further, the term 'or' means 'inclusive or' rather than 'exclusive or'. That is, unless otherwise stated or clear from the context, the expression that 'x uses a or b' means any one of natural inclusive permutations.

A term "device" used herein may refer to a display device including a display panel and a driver for driving the display panel. Examples of the display device may include an organic light emitting diode (OLED), and the like. In addition, examples of the device may include a notebook computer, a television, a computer monitor, an automotive device, a wearable device, and an automotive equipment device, and a set electronic device (or apparatus) or a set device (or apparatus), for example, a mobile electronic device such as a smartphone or an electronic pad, which are complete products or final products respectively including OLED and the like, but embodiments of the present disclosure are not limited thereto.

The terms used in the description below have been selected as being general and universal in the related technical field. However, there may be other terms than the terms depending on the development and/or change of technology, convention, preference of technicians, etc. Therefore, the terms used in the description below should not be understood as limiting technical ideas, but should be understood as examples of the terms for describing embodiments.

Further, in a specific case, a term may be arbitrarily selected by the applicant, and in this case, the detailed meaning thereof will be described in a corresponding description section. Therefore, the terms used in the description below should be understood based on not simply the name of the terms, but the meaning of the terms and the contents throughout the Detailed Descriptions.

Hereinafter, a display panel according to an exemplary embodiment of the present disclosure and a display device including the same will be described.

FIG. 1 is a block diagram schematically illustrating a display device according to an exemplary embodiment of the present disclosure. All the components of each display device according to all embodiments of the present disclosure are operatively coupled and configured.

Referring to FIG. 1, a display device 100 according to an exemplary embodiment of the present disclosure may include a display panel 10, a timing controller 20, a gate driver 30, a data driver 40, and a light-emission signal supply 50.

The display panel 10 may include a display area or an active area AA and a non-display area or a non-active area N/A. A plurality of pixels P may be disposed in the display area A/A of the display panel 10. For example, a plurality of gate lines GL and a plurality of data lines DL may be disposed in the display panel 10, and the pixel P may be disposed in an area where the gate line GL and the data line DL intersect each other. Each pixel P may include at least one of sub-pixels SP respectively emitting light beams of red (R), green (G), and blue (B) colors, but the embodiment of present disclosure is not limited thereto. For example, each pixel P may also include at least one of sub-pixels SP respectively emitting light beams of white (W), red (R), green (G), and blue (B) colors.

In the display panel 10, the plurality of gate lines GL and a plurality of light-emission lines EL may intersect the plurality of data lines DL. Each of the plurality of pixels is connected to the gate line GL, the light-emission line EL and the data line DL.

Specifically, one pixel receives a gate signal from the gate driver 300 via the gate line GL, receives a data signal from the data driver 400 via the data line DL, receives a light-emission signal EM(N) via the light-emission line EL, and receives various powers via a power supply line.

In this regard, the gate line GL supplies a scan signal SC. The light-emission line EL supplies the light-emission signal EM(N). The data line DL supplies the data voltage $V_{Data}$.

However, according to various embodiments, the gate line GL may include a plurality of scan signal lines. The data line DL may additionally include a plurality of power supply lines VL.

Moreover, the light-emission line EL may include a plurality of light-emission signal lines. Moreover, one pixel receives a first driving power ELVDD and a second driving power ELVSS.

Moreover, one pixel receives first and second bias voltages V1 and V2 via one power supply line VL.

Moreover, each pixel includes a light-emitting element ELD and a pixel circuit that controls an operation of the light-emitting element ELD. In this regard, the light-emitting element is composed of an anode, a cathode, and an organic light-emissive layer between the anode and the cathode.

A pixel circuit includes a plurality of switching elements, a driving element, and a capacitor. In this regard, the switching element may be embodied as a thin-film transistor (TFT). In the pixel circuit, the driving element may be embodied as a thin-film transistor (TFT) and may control an amount of current supplied to the light-emitting element ELD according to a difference between a data voltage charged in a capacitor and a reference voltage to control an amount of light emitted from the light-emitting element ELD. Moreover, the plurality of switching TFTs receive the scan signal SC supplied via the gate line GL and the light-emission signal EM(N) supplied via the light-emission line EL to charge the data voltage $V_{Data}$ to the capacitor.

In order to drive the display panel 10 including a plurality of pixels, the display device 100 according to an exemplary embodiment of the present disclosure may further include the gate driver 30, the data driver 40, the light-emission signal supply 50, and the timing controller 20 for controlling the gate driver 30, the data driver 40, and the light-emission signal supply 50.

In this regard, the light-emission signal supply 50 is configured to adjust a duty ratio of the light-emission signal EM(N). For example, the light-emission signal supply 50 may include a shift register and a latch for adjusting the duty ratio of the light-emission signal EM(N). Under a light-emission control signal ECS generated from the timing controller 20, the light-emission signal supply 50 generates a light-emission signal having a first duty ratio when the pixel circuit operates at a first refresh rate and supplies the same to the pixel circuit, and generates a light-emission signal EM(n) having a second duty ratio different from the first duty ratio when the pixel circuit operates at a second refresh rate and supplies the same to the pixel circuit.

The timing controller 20 controls each of the gate driver 30, the data driver 40 and the light-emission signal supply 50.

The timing controller 20 processes image data RGB input from an external source to suit a size and a resolution of the display panel 10 and supplies the same to the data driver 40.

The timing controller 20 generates gate, data, and light-emission control signals GCS, DCS, and ECS using synchronization signals SYNCs input from an external source, for example, a dot clock signal CLK, a data enable signal DE, a horizontal synchronization signal Hsync, and a vertical synchronization signal Vsync. The timing controller 20 supplies the generated gate, data, and light-emission control signals GCS, DCS, and ECS to the gate driver 30, the driver 40, and the light-emission signal supply 50, respectively to control the gate driver 30, the data driver 40 and the light-emission signal supply 50.

The timing controller 20 may be configured to be combined with various processors, for example, a microprocessor, a mobile processor, an application processor, etc., according to a type of a device on which the timing controller is mounted.

The timing controller 20 generates a signal so that a pixel can operate at various refresh rates. That is, the timing controller 20 generates a signal related to pixel operation such that a pixel operates in a variable refresh rate (VRR) mode or an operation mode thereof is able to switch to between a first refresh rate and a second refresh rate. For example, the timing controller 20 simply changes a speed of a clock signal, generates a synchronization signal such that a horizontal blank or a vertical blank occurs, or drives the gate driver 30 in a mask scheme to allow the pixel to operate at different refresh rates.

Moreover, the timing controller 20 generates various signals to allow the pixel to operate at the first refresh rate. In particular, the timing controller 20 generates the light-emission control signal ECS so that the light-emission signal supply 50 generates the light-emission signal EM(N) having the first duty ratio when the pixel operates at the first refresh rate. Then, the timing controller 20 operates to allow the pixel to operate at the second refresh rate. To this end, the timing controller 20 generate various signals to allow the pixel to operate at the second refresh rate. In particular, the timing controller 20 generates the light-emission control signal ECS so that the light-emission signal supply 50 generates the light-emission signal EM(N) having the second duty ratio different from the first duty ratio when the pixel operates at the second refresh rate.

The gate driver 30 may supply a scan signal to each of a plurality of pixels.

The gate driver 30 supplies the scan signal SC to the gate line GL according to the gate control signal GCS supplied from the timing controller 20. In FIG. 1, it is shown that the gate driver 30 are disposed on one side of the display panel 10 and is spaced apart therefrom. However, the number and arrangement position of the gate drivers 30 are not limited thereto. For example, the gate driver 30 may be disposed on one side or each of both opposing sides of the display panel 10 in a gate in panel (GIP_) scheme. Alternatively, the gate driver 30 can be integrated and arranged on the display panel 10, or each gate driver 30 can be implemented by a chip-on-film (COF) scheme in which an element is mounted on a film connected to the display panel 10. Alternatively, the gate drivers 30 may be individually mounted on a circuit film which may be bonded and connected to the display panel 10 in a tape automatic bonding (TAB) scheme. Alternatively, the gate drivers 30 may be mounted on the display panel 10 in a Chip on glass (COG) scheme.

The gate driver 30 may include a plurality of stages STk 60 that sequentially output a gate pulse (or a scan pulse). For example, the gate driver 30 includes a shift register, a level shifter for converting an output signal of the shift register into a single having a swing width suitable for an operation of a thin-film transistor of each pixel, and an output buffer connected to and disposed between the level shifter and the gate lines GL. The gate driver may sequentially output the gate (scan) pulse having a pulse width of about 1 horizontal period.

A start signal VST swinging between a gate high voltage VGH and a gate low voltage VGL, a shift clock CLK1 to CLK3 (hereinafter referred to simply as a clock), etc. may be input to each stage STk.

The stages STk may start to output a second scan signal SCAN2 in response to the start signal VST, and may shift the output according to the clock CLK1 to GCLK3. The second scan signal SCAN2 sequentially output from the stages STk is supplied to the gate lines GL.

One or more of the scan signals of current stages may be input, as a start signal, to at least one of next stages and may be further input, as a reset signal, to one of previous stages. The stage STk may output a carry signal CRY separate from the scan signal, and may supply the carry signal, as a control signal, to the previous stage or the next stage. For example, the carry signal may be supplied to the next stage as a start signal or may be supplied to the previous stage as a reset signal.

Moreover, the gate driver 30 together with a thin-film transistor array of the display area A/A may be formed in a substrate and may be implemented as a GIP (gate in panel) circuit formed directly in a bezel area or a non-display area N/A of the display panel 10.

The gate driver 30 together with the thin-film transistor array constituting the pixel array of the display panel 10 may be formed in a substrate, and may be embedded in the non-display area on each of both opposing sides or one side of the display area of the display panel 10 in the GIP scheme. For example, in FIG. 1, the data driver 40 is shown as a component separate from the display panel 10, However, the present disclosure is not limited thereto, and the data driver 40 may be embedded in the bezel area and may be formed integrally with the display panel 10 and thus may be configured in the GIP scheme.

The gate driver 30 shifts the gate signal using the shift register such that the gate signal may be supplied sequentially to the gate lines GL. The gate signal may include a scan (gate) signal and a light-emission control signal EM. The gate lines GL may include gate lines to which the scan (gate) signal is applied, and gate lines to which the light-emission control signal is applied.

Moreover, depending on a driving scheme or a design of the display panel 10, the gate driver 30 may be located only on one side of the display panel 10 or may be located on each of both opposing sides of display panel 10. The gate driver 30 according to an exemplary embodiment of the present disclosure is composed of one or a plurality of gate ICs (Integrated Circuit). In this regard, in a COF manner, the gate IC may be individually mounted on a circuit film which may be bonded and connected to the display panel 10 in a TAB scheme. Alternatively, the gate IC may be mounted on the display panel 10 in a COG scheme.

The data driver 40 may supply a data voltage to each of the plurality of pixels P. For example, the data driver 40 may supply a source data signal to a plurality of data lines DL in each pixel P.

The data lines DL may be connected with the data driver 40 through a data pad. Although the data driver 40 is shown as being disposed on one side of the display panel 10 in FIG. 1, the number and position of the data driver 40 are not limited thereto.

The data driver 40 converts the image data RGB into a data voltage $V_{Data}$ according to the data control signal DCS supplied from the timing controller 20, and supplies the converted data voltage $V_{Data}$ to the pixel via the data line DL.

That is, the data driver 40 receives, for example, an image signal of a digital waveform applied from the timing controller 20 and converts the received image signal into a data voltage in a form of an analog voltage having a gradation value that the pixel P can process. Moreover, in response to the input data control signal DCS, the data driver 40 may supply the data voltage to each pixel P via the data line DL. In this regard, the data driver 40 may convert the image signal into the data voltage using a plurality of reference voltages supplied from a reference voltage supply (not shown).

The light-emission signal supply 50 may supply the light-emission signal to each of the plurality of pixels. In this regard, the light-emission signal supply 50 is configured as a separate component in FIG. 1. However, the present disclosure is not limited thereto and the light-emission signal supply 50 may be configured to be included in the gate driver 30. Moreover, the light-emission signal supply 50 may be referred to as a 'light-emission control signal driver 50'.

Figure 2:
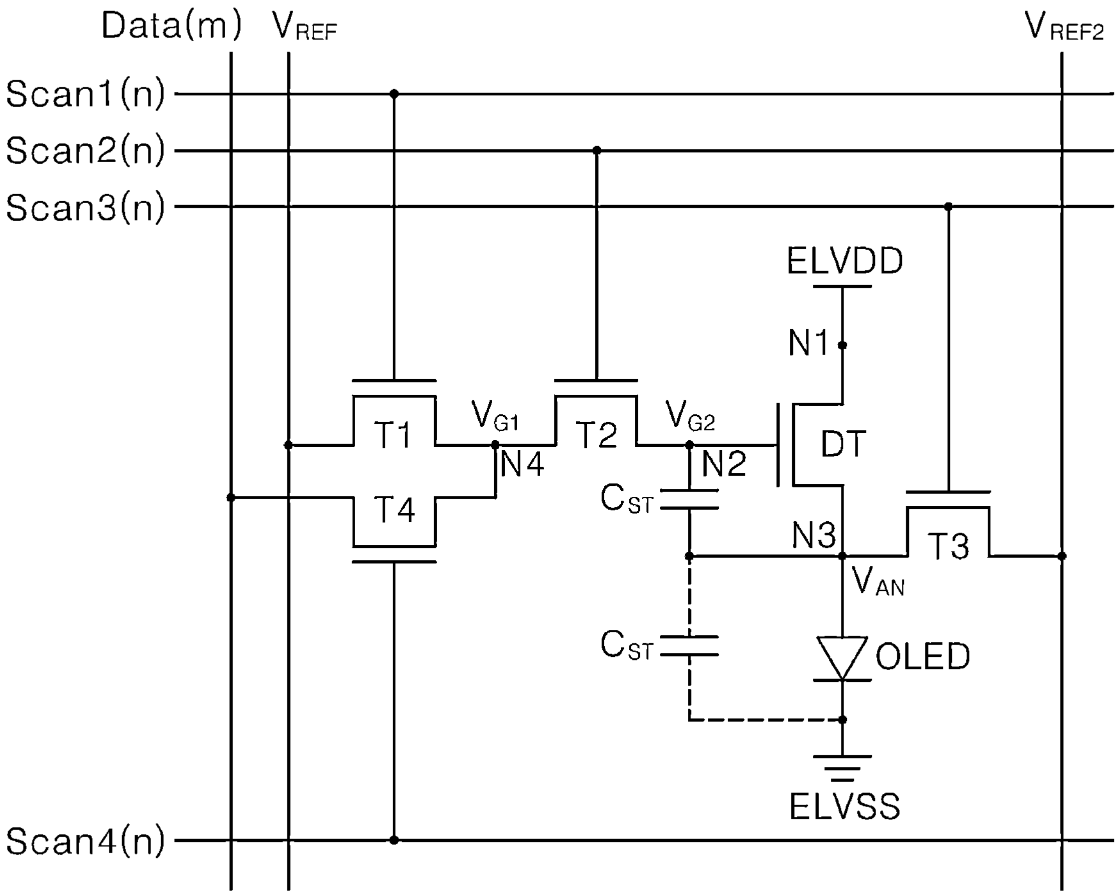
FIG. 2 is an illustrative circuit diagram of a pixel circuit in a display device according to an exemplary embodiment of the present disclosure.

FIG. 2 is an illustrative circuit diagram of a pixel circuit in a display device according to an exemplary embodiment of the present disclosure.

FIG. 2 shows a pixel circuit by way of example for illustration. The pixel circuit may have any structure in which the light-emission signal EM(N) is applied to the pixel circuit so as to control light emission of the light-emitting element OELD. For example, the pixel circuit may include an additional scan signal, a switching TFT connected thereto, and a switching TFT to which an additional initialization voltage is applied. A connection relationship of a switching element or a connection position of the capacitor may vary. That is, pixel circuits with various structures may be used as long as the light emission of the light-emitting element ELD is controlled according to change in the duty ratio of the light-emission signal EM(N) such that the light emission is controlled according to a refresh rate. For example, various pixel circuits such as 3T1C, 4T1C, 6T1C, 7T1C, and 7T2C configurations may be used. Hereinafter, for convenience of illustration, the display device with a pixel circuit of the 5T1C structure in FIG. 2 will be described.

The pixel circuit may control a driving current Id flowing in the organic light-emitting element OELD to drive the organic light-emitting element OELD. The pixel circuit may include a driving transistor DT, first to fourth transistors T1 to T4, and a storage capacitor $C_{ST}$. When a first and a second scan signal of a high-level applied to the pixel circuit in an overlapping manner as the same time, threshold voltage compensation performed at least twice or more based on threshold voltage sensing.

Referring to FIG. 2, each of the plurality of pixels according to the present disclosure may include an organic light-emitting element OLED that emits light based on the driving current, the driving transistor DT, the first transistor T1 to the fourth transistor T4.

The organic light-emitting element OLED may include a pixel electrode (or an anode electrode) and a cathode electrode. The pixel electrode of the organic light-emitting element OELD may be connected to a third node N3, while the cathode electrode thereof may be connected to a second driving power, that is, a low-potential driving voltage ELVSS.

Each of the transistors DT, T1 to T4 may be embodied as a PMOS transistor or an NMOS transistor. For example, each of the driving transistor DT and the first transistor T1 to the fourth transistor T4 may be embodied as an n-type MOSFET NMOS or a p-type MOSFET PMOS. The PMOS transistor is turned on based on a low-level voltage applied thereto. The NMOS transistor is turned on based on a high-level voltage applied thereto.

Moreover, each of the driving transistor DT and the first transistor T1 to the fourth transistor T4 may be embodied as an oxide thin-film transistor, a low-temperature polycrystalline silicon (LTPS) thin-film transistor, or a crystallized silicon (c-Si) transistor.

The oxide thin-film transistor TFT may have an excellent effect of preventing or at least reducing a leakage current and relatively inexpensive manufacturing cost. Therefore, according to the embodiment of the present disclosure, a driving TFT may be manufactured using an oxide semiconductor material, and at least one switching TFT may be also manufactured using the oxide semiconductor material.

The oxide semiconductors may be made of a metal oxide such as zinc (Zn), indium (In), gallium (Ga), tin (Sn), and titanium (Ti) or a combination of a metal such as zinc (Zn), indium (In), gallium (Ga), tin (Sn), or titanium (Ti) and its oxide. Specifically, the oxide semiconductor may include zinc oxide (ZnO), zinc-tin oxide (ZTO), zinc-indium oxide (ZIO), indium oxide (InO), titanium oxide (TiO), indium-gallium-zinc oxide (IGZO), indium-zinc-tin oxide (IZTO), indium zinc oxide (IZO), indium gallium tin oxide (IGTO), and indium gallium oxide (IGO), but is not limited thereto.

The driving transistor DT controls the driving current, and may include a first electrode as a first node N1, a gate electrode as a second node N2, and a second electrode as the third node N3. In this regard, one of the first electrode and the second electrode may act as a source electrode, while the other of the first electrode and the second electrode may act as a drain electrode.

The driving transistor DT may have the first electrode connected to a high-potential driving voltage line transmitting the high-potential driving voltage ELVDD as the first driving power. The driving transistor DT may have the gate electrode connected to a second electrode of the second transistor T2 and a first electrode of the storage capacitor $C_{ST}$. The driving transistor DT may have the second electrode connected to the first electrode of the organic light-emitting element OLED, a first electrode of the third transistor T3, and a second electrode of the storage capacitor $C_{ST}$.

The driving transistor DT may provide the driving current Id to the organic light-emitting element OELD based on a voltage of the second node N2 (or a data voltage stored in the storage capacitor $C_{ST}$ as described later).

The first transistor T1 may include a first gate electrode connected to a first scan signal line Scan1 transmitting a first scan signal Scan1(*n*). The first transistor T1 may have a first electrode connected to a first reference voltage line transmitting a first reference voltage $V_{REF}$, and a second electrode connected to a first electrode of the second transistor T2 and a second electrode of the fourth transistor T4.

The second transistor T2 may include a second gate electrode connected to a second scan signal line Scan2 transmitting a second scan signal Scan2(*n*). The second transistor T2 may have the first electrode connected to the second electrode of the first transistor and a second electrode of the fourth transistor, and a second electrode connected to the second node and one electrode of the first capacitor.

The third transistor T3 may include a third gate electrode connected to a third scan signal line Scan3 that transmits a third scan signal Scan3(*n*). The third transistor T3 may have a first electrode connected to the third node N3, and a second electrode connected to a second reference voltage line transmitting a second reference voltage $V_{REF2}$. That is, the first electrode of the third transistor T3 may be connected to the third electrode of the driving transistor DT, the anode electrode of the organic light-emitting element OLED, and the second electrode of the storage capacitor $C_{ST}$.

The fourth transistor T4 may include a fourth gate electrode connected to a fourth scan signal line Scan4 transmitting a fourth scan signal Scan4(*n*). The fourth transistor T4 may have a first electrode connected to a data voltage line Data transmitting the data voltage Data(m), and a second electrode connected to the second electrode of the first transistor T1 and the first electrode of the second transistor T2.

The storage capacitor $C_{ST}$ may connect the second node N2 and the third node N3 to each other. For example, the storage capacitor $C_{ST}$ may connect the gate electrode and the source electrode of the driving transistor DT to each other.

The storage capacitor $C_{ST}$ may be connected to and disposed between the second node N2 and the third node N3. The storage capacitor $C_{ST}$ may store or maintain therein the data signal $V_{Data}$ provided thereto.

Figure 3:
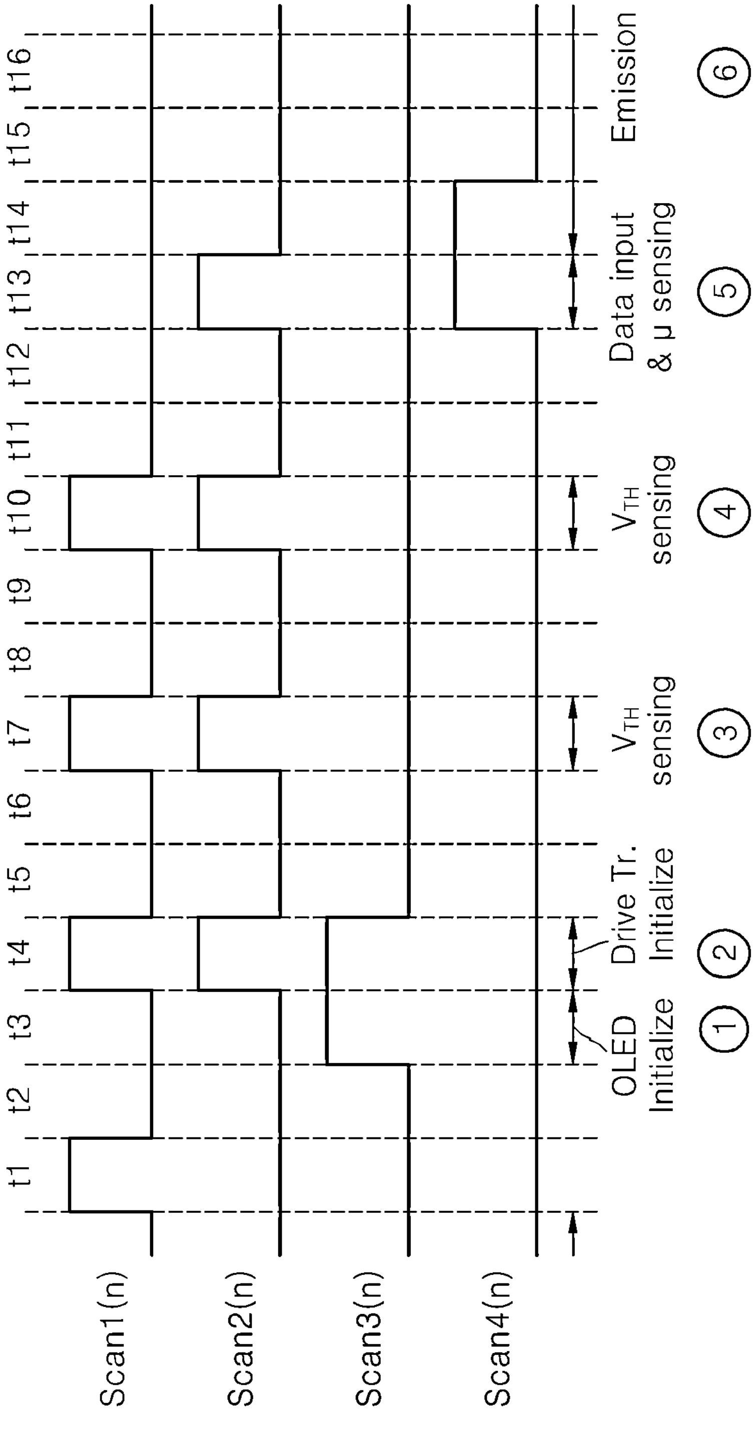
FIG. 3 is a diagram showing an operation of a scan signal during 1 frame in a display device according to an exemplary embodiment of the present disclosure.

FIG. 3 is a diagram showing an operation of a scan signal during 1 frame in a display device according to an exemplary embodiment of the present disclosure.

Referring to FIG. 3, each of the plurality of pixels P in the display device 100 according to an exemplary embodiment of the present disclosure may operate in following separate periods: an initialization period (OLED initialize) ① of the organic light-emitting element (OLED), an initialization period (Drive TR Initialize) ② of the driving transistor, threshold voltage sensing periods ($V_{TH}$ sensing) ③ and ④, a data input time and mobility sensing period (Data input & μ sensing) ⑤, and an emission period (Emission) ⑥. This is only one example and the present disclosure is not necessarily limited to this order.

Each of the plurality of pixels P may initialize a voltage charged in the pixel circuit or remaining therein. Specifically, effects of the data voltage $V_{Data}$ and the first driving power ELVDD stored in the previous frame may be removed. Accordingly, each of the plurality of pixels P may display an image corresponding to a new data voltage $V_{Data}$.

An exemplary embodiment shown in FIG. 3 shows an example in which a pulse signal having a width of 1 horizontal period (1H) or a pulse signal having a width of 2 horizontal periods (2H) is applied to one pixel P during a first time t1 to a 16-th time t16.

During the initialization period (OLED Initialize) ① of the organic light-emitting element, the third scan signal Scan3[*n*] may be applied, as a high-level pulse signal, to the pixel P via the third scan signal line Scan3 at the third time t3.

During the initialization period (Drive TR Initialize) ② of the driving transistor DT, each of the first scan signal Scan1(*n*), the second scan signal Scan2(*n*), and the third scan signal Scan3(*n*) may be applied, as a high-level pulse signal, to the pixel P.

The first scan signal Scan1([n) may be applied, as a high-level pulse signal, to the pixel P via the first scan signal line Scan1 at each of the first time t1, the fourth time t4, the seventh time t7, and the tenth time t10. That is, the first scan signal Scan1(*n*) may be applied every 3 horizontal periods (3H) or every 3 horizontal periods (3H) or greater.

The second scan signal Scan2(*n*) may be applied, as a high-level pulse signal, to the pixel P via the second scan signal line Scan2 at each of the fourth time t4, the seventh time t7, the tenth time t10, and the 13-th time t13. That is, the second scan signal Scan2(*n*) may be applied every 3 horizontal periods (3H) or every 3 horizontal periods (3H) or greater.

The third scan signal Scan3(*n*) may be applied, as a high-level pulse signal, to the pixel P via the third scan signal line Scan3 at the third time t3 and the fourth time t4.

As described above, during the initialization period (Drive TR Initialize) ② of the driving transistor DT, the first scan signal Scan1[*n*], the second scan signal Scan2(*n*), and the third scan signal Scan3(*n*) may be applied to the pixel P in an overlapping manner at the fourth time t4 at the same time.

During each of the threshold voltage sensing periods ($V_{TH}$ Sensing) ③ and ④, the first scan signal Scan1(*n*) and the second scan signal Scan2(*n*) may be applied, as a high-level pulse signal, to the pixel P in an overlapping manner at each of the seventh time t7 and the tenth time t10 as the same time.

At this time, the gate driver 30 may output a high-level clock pulse related to each of the first scan signal Scan1(*n*) and the second scan signal Scan2(*n*) at least twice or more every 3 horizontal periods (3H) or every 3 horizontal periods (3H) or greater.

In each of the plurality of pixels, threshold voltage compensation may be performed based on threshold voltage sensing ($V_{TH}$ Sensing) when the first scan signal Scan1(*n*) and the second scan signal Scan2(*n*) have a high-level and overlap each other during each of the threshold voltage sensing periods ($V_{TH}$ sensing) ③ and ④ between the initialization period (Drive TR Initialize) ② of the driving transistor DT and the data input time and mobility sensing period (Data input & μ sensing) ⑤.

In this regard, the threshold voltage sensing periods may occur repeatedly. For example, the threshold voltage sensing periods ($V_{TH}$ sensing) ③ and ④ may occur at the seventh time t7 and the tenth time t10, respectively. That is, whenever the threshold voltage sensing period is repeated, the number of times at which the first scan signal Scan1(*n*) and the second scan signal Scan2(*n*) having the high-level overlap each other may increase.

Therefore, in each of the plurality of pixels, as the number of times at which the first scan signal Scan1(*n*) and the second scan signal Scan2(*n*) having the high-level overlap each other increases during the threshold voltage sensing periods ($V_{TH}$ sensing) ③ and ④, a compensation rate (or compensation amount) for the threshold voltage $V_{TH}$ may be increased.

During the data input time and mobility sensing period (Data input & μ sensing) ⑤, each of the second scan signal Scan2(*n*) and the fourth scan signal Scan4[*n*] may be applied, as a high-level pulse signal, to the pixel P at the 13-th time t13.

During the emission (Emission) period ⑥, the fourth scan signal Scan4(*n*) may be applied, as a high-level pulse signal, to the pixel P via the fourth scan signal line Scan4 at the 14-th time t14.

Figure 4:
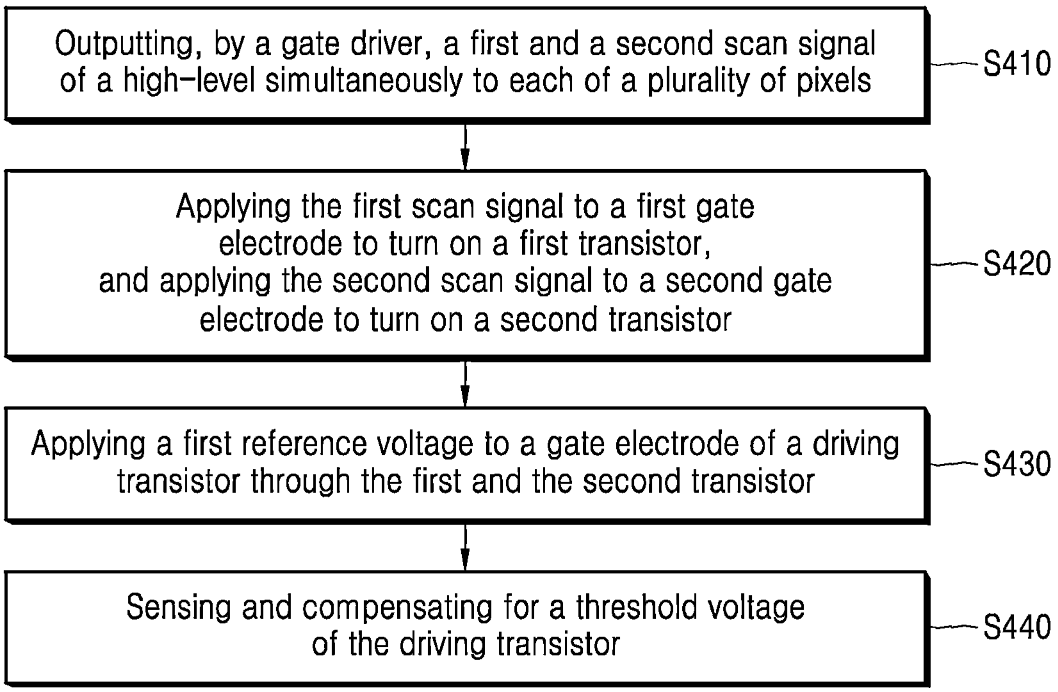
FIG. 4 is a diagram showing an operational flowchart for illustrating a pixel driving method of a display device according to an exemplary embodiment of the present disclosure.

FIG. 4 is a diagram showing an operational flowchart for illustrating a method for driving a pixel of a display device according to an exemplary embodiment of the present disclosure.

Referring to FIG. 4, in the display device 100 according to an exemplary embodiment of the present disclosure, the gate driver 30 simultaneously outputs the first scan signal Scan1(*n*) of a high-level and the second scan signal Scan2(*n*) of a high-level in an overlapping manner to each of the plurality of pixels during the threshold voltage sensing period ($V_{TH}$ sensing period) in S410.

In S410, the gate driver 30 may output each of the third scan signal Scan3(*n*) and the fourth scan signal Scan4(*n*) at a low-level to each of the plurality of pixels. Accordingly, the third scan signal Scan3(*n*) of low-level may be applied to the third gate electrode, while the fourth scan signal Scan4(*n*) of the low-level may be applied to the fourth gate electrode. Accordingly, each of the third transistor and the fourth transistor may be turned off during the threshold voltage sensing period.

Subsequently, the first scan signal Scan1(*n*) of a high-level is applied to the first gate electrode to turn on the first transistor, while the second scan signal Scan2(*n*) of a high-level is applied to the second gate electrode to turn on the second transistor in S420.

Subsequently, the first reference voltage is applied to the gate electrode of the driving transistor through the first transistor and the second transistor in S430.

Subsequently, as the threshold voltage between the gate electrode and the source electrode of the driving transistor DT is sensed, the threshold voltage of the driving transistor DT is compensated for in S440.

In this regard, a voltage difference across the storage capacitor $C_{ST}$ may be the threshold voltage.

Moreover, the voltage of the anode electrode of the organic light-emitting element OLED may be a voltage obtained by subtracting the threshold voltage of the driving transistor from the first reference voltage.

Figure 5A:
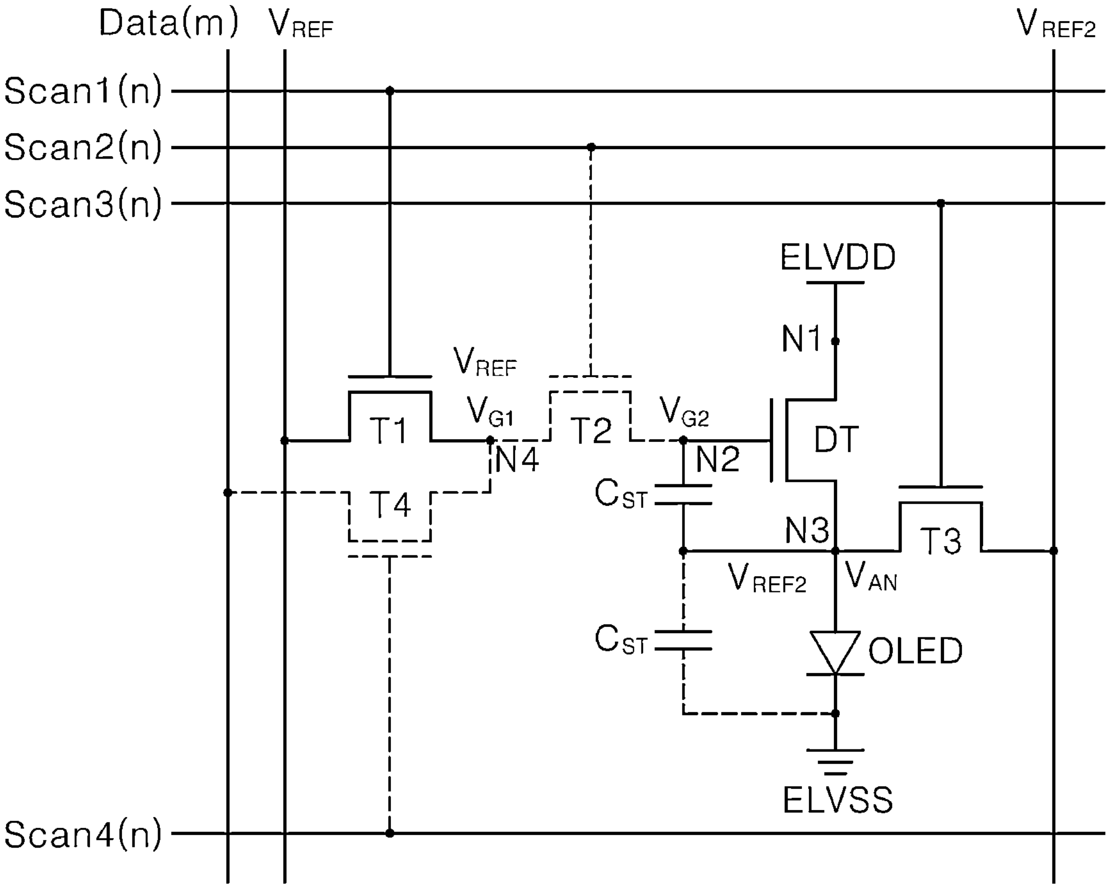
FIG. 5A and FIG. 5B are diagrams showing an operation of each transistor and signal waveforms during an initialization period of an organic light-emitting element according to an exemplary embodiment of the present disclosure.
Figure 5B:
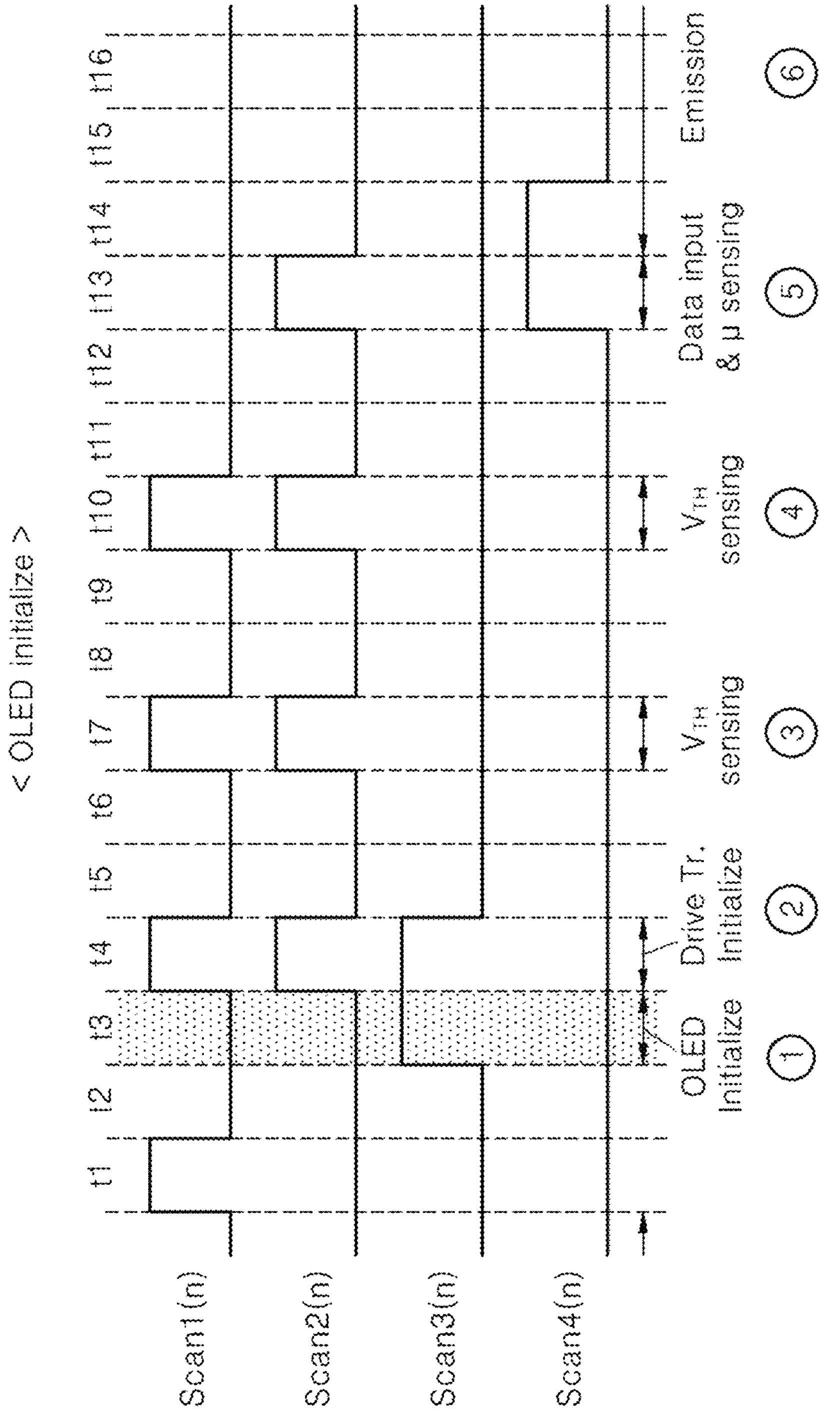

FIG. 5A and FIG. 5B are diagrams showing an operation of each transistor and signal waveforms during an initialization period of an organic light-emitting element according to an exemplary embodiment of the present disclosure.

Referring to FIG. 5A and FIG. 5B, during the initialization period (OLED initialize) ① of the organic light-emitting element (OLED) according to an exemplary embodiment of the present disclosure, the third scan signal Scan3(*n*) may be applied, as a high-level pulse signal, to the third gate electrode of the third transistor T3 via the third scan signal line Scan3 at the third time t3.

Therefore, the third transistor T3 is turned on based on the high-level pulse signal of the third scan signal Scan3 [n]. The second reference voltage $V_{REF2}$ is applied to the anode electrode of the organic light-emitting element OLED as the third node N3 through the third transistor T3.

In this regard, the organic light-emitting element OLED disposed in each pixel may be formed using a thermal evaporation process using a shadow mask or using a solution process such as inkjet. The organic light-emitting element OLED may include a hole injecting layer (HIL), a hole transporting layer (HTL), a light-emitting material layer (EML), an electron transporting layer (ETL), and an electron injecting layer (EIL). However, the present disclosure is not limited thereto.

For example, in a vertical cross-sectional structure of each pixel, a cathode electrode layer constitutes a top of the organic light-emitting element OLED. A planarization layer may be disposed on top of the cathode electrode layer.

The anode electrode layer may be made of molybdenum (Mo), indium tin oxide (ITO), indium zinc oxide (IZO), indium tin zinc oxide (ITZO), tin oxide (SnO), zinc oxide (ZnO), zinc-tin oxide (ZTO), zinc-indium oxide (ZIO), indium oxide (InO), titanium oxide (TiO), indium-gallium-zinc oxide (IGZO), indium-zinc-tin oxide (IZTO), indium zinc oxide (IZO), indium gallium tin oxide (IGTO), and indium gallium oxide (IGO), but is not limited thereto.

The cathode electrode may also be made of at least one of magnesium (Mg), calcium (Ca), sodium (Na), titanium (Ti), indium (In), yttrium (Y), lithium (Li), aluminum (Al), silver (Ag), tin (Sn), lead (Pb), or an alloy thereof.

In FIG. 5A and FIG. 5B, the third scan signal Scan3(*n*) may be applied, as a high-level pulse signal, to the third gate electrode of the third transistor T3 for 2 horizontal periods (2H) or for 2 horizontal periods (2H) or greater.

The second reference voltage $V_{REF2}$ may be applied to the third node N3 through the third transistor T3 such that the anode electrode of the organic light-emitting element OLED may be initialized by the second reference voltage $V_{REF2}$.

Therefore, during the initialization period (OLED initialize) ① of the organic light-emitting element (OLED), a voltage $V_{AN}$ of the anode electrode of the organic light-emitting element OLED may become the second reference voltage $V_{REF2}$.

Figure 6A:
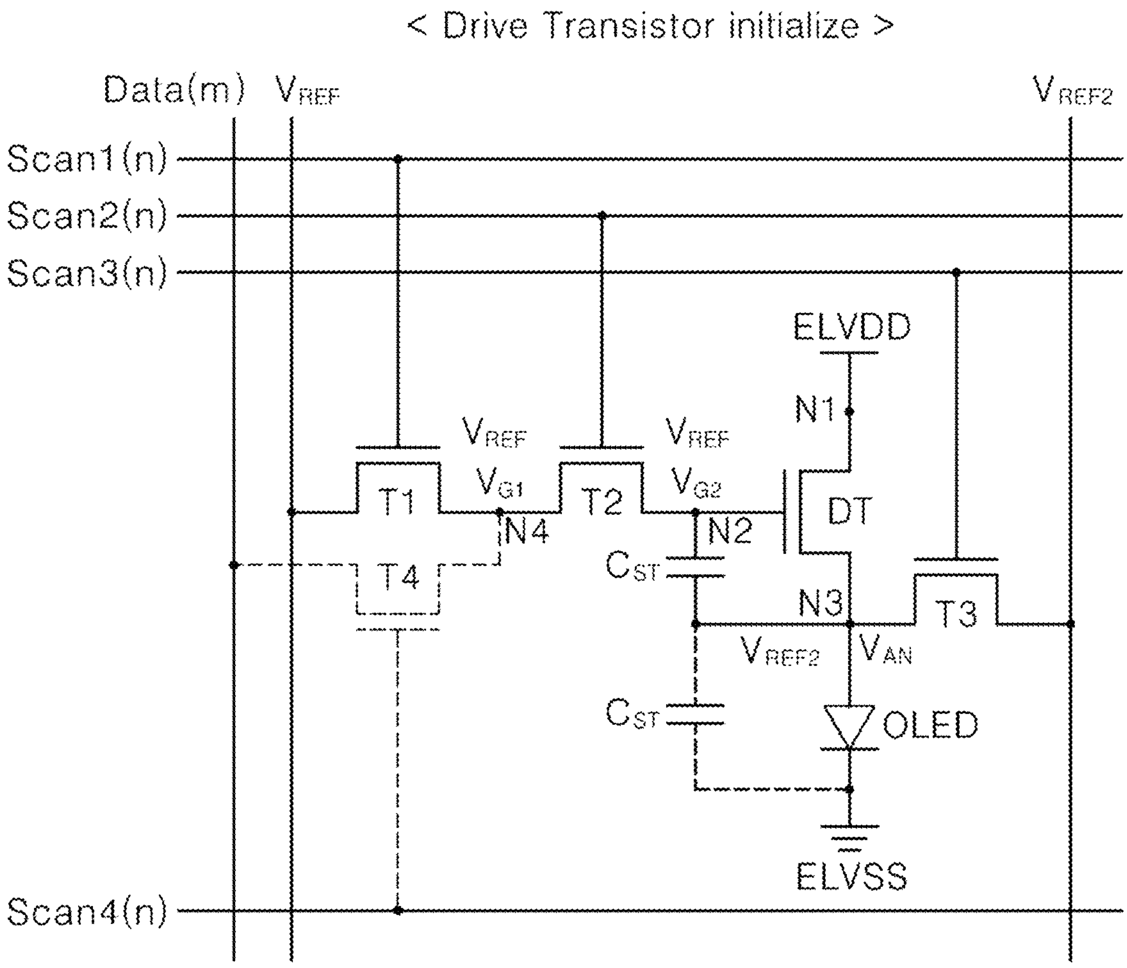
FIG. 6A and FIG. 6B are diagrams showing an operation of each transistor and signal waveforms during an initialization period of a driving transistor according to an exemplary embodiment of the present disclosure.
Figure 6B:
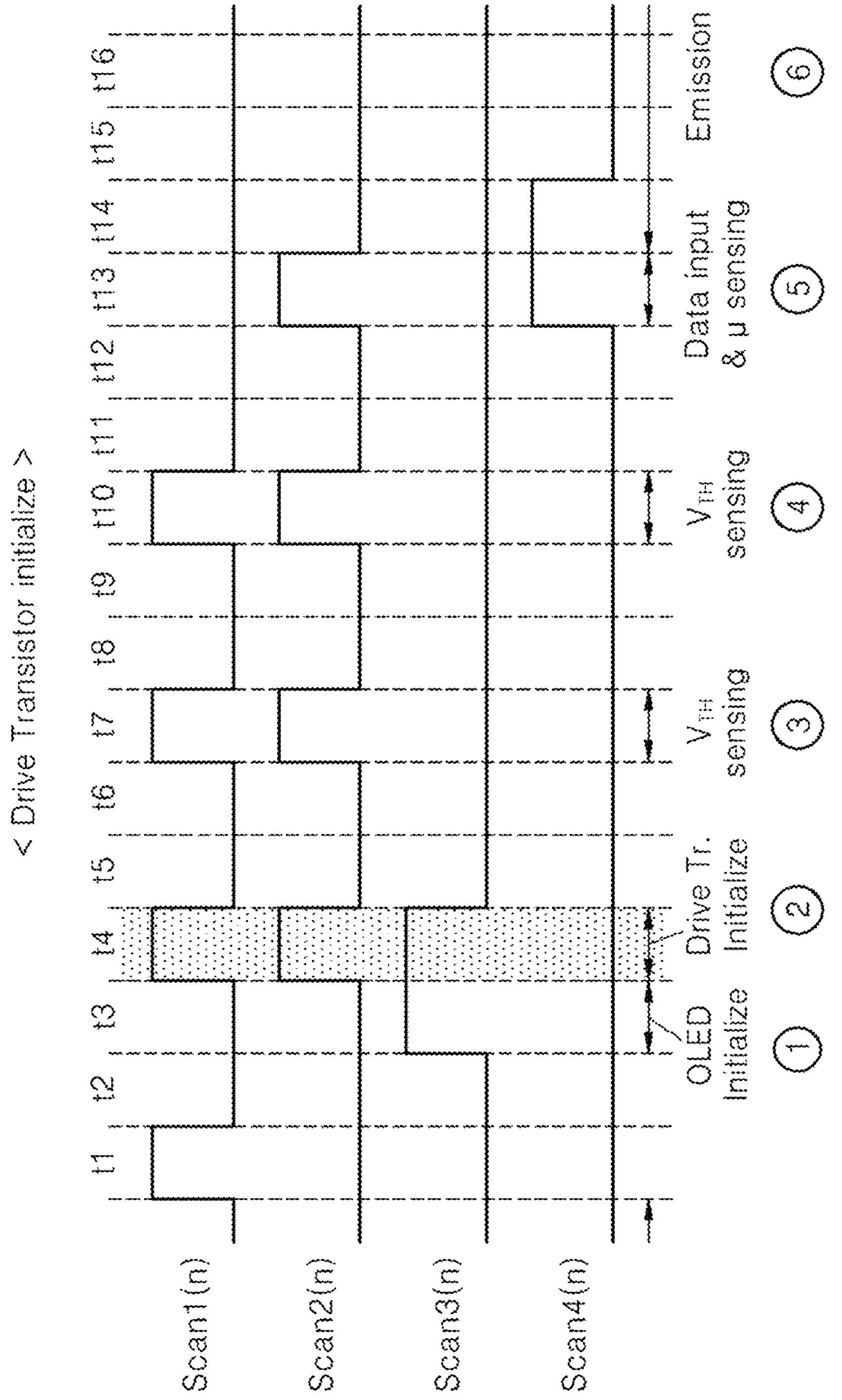

FIG. 6A and FIG. 6B are diagrams showing an operation of each transistor and signal waveforms during an initialization period of a driving transistor DT according to an exemplary embodiment of the present disclosure.

Referring to FIG. 6A and FIG. 6B, during the initialization period (Drive TR Initialize) ② of the driving transistor DT according to an exemplary embodiment of the present disclosure, the first scan signal Scan1(*n*), the second scan signal Scan2[*n*], and the third scan signal Scan3[*n*] may be simultaneously applied, as a high-level pulse signal, to the pixel P in an overlapping manner at the fourth time t4.

The first scan signal Scan1(*n*) of a high-level may be applied to the first gate electrode of the first transistor T1 so that the first transistor T1 is turned on. The second scan signal Scan2(*n*) of a high-level may be applied to the second gate electrode of the second transistor T2 to turn on the second transistor T2. The third scan signal Scan3(*n*) of a high-level may be applied to the third gate electrode of the third transistor T3 such that the third transistor T3 is turned on.

Therefore, the first reference voltage $V_{REF}$ may be applied to the gate electrode of the driving transistor DT as the second node N2 through the first transistor T1 and the second transistor T2, such that the gate electrode of the driving transistor DT is initialized by the first reference voltage $V_{REF}$.

Moreover, the second reference voltage $V_{REF2}$ may be applied to the second electrode of the driving transistor DT as the third node N3 through the third transistor T3, so that the second electrode of the driving transistor DT is initialized by the second reference voltage $V_{REF2}$.

In this regard, the first scan signal Scan1(*n*) of a high-level may be applied to the first gate electrode for 1 horizontal period (1H). The second scan signal Scan2(*n*) of a high-level may be applied to the second gate electrode for 1 horizontal period (1H). The third scan signal Scan3(*n*) of a high-level may be applied to the third gate electrode for 2 horizontal periods (2H).

Therefore, during the initialization period ② of the driving transistor DT, the first transistor T1 and the second transistor T2 are turned on, and the gate electrode of the driving transistor DT is initialized by the first reference voltage $V_{REF}$, such that the gate electrode voltage $V_{G2}$ of the driving transistor DT may become the first reference voltage $V_{REF}$.

Moreover, during the initialization period ② of the driving transistor DT, the third transistor T3 is turned on, and the second electrode of the driving transistor DT is initialized by the second reference voltage $V_{REF2}$, such that the voltage $V_{AN}$ of the anode electrode of the organic light-emitting element OLED may become the second reference voltage $V_{REF2}$.

In this case, a voltage VGS between the gate and the source of the driving transistor DT may become a voltage ($V_{REF}-V_{REF2}$) obtained by subtracting the second reference voltage $V_{REF2}$ from the first reference voltage $V_{REF}$.

Figure 7A:
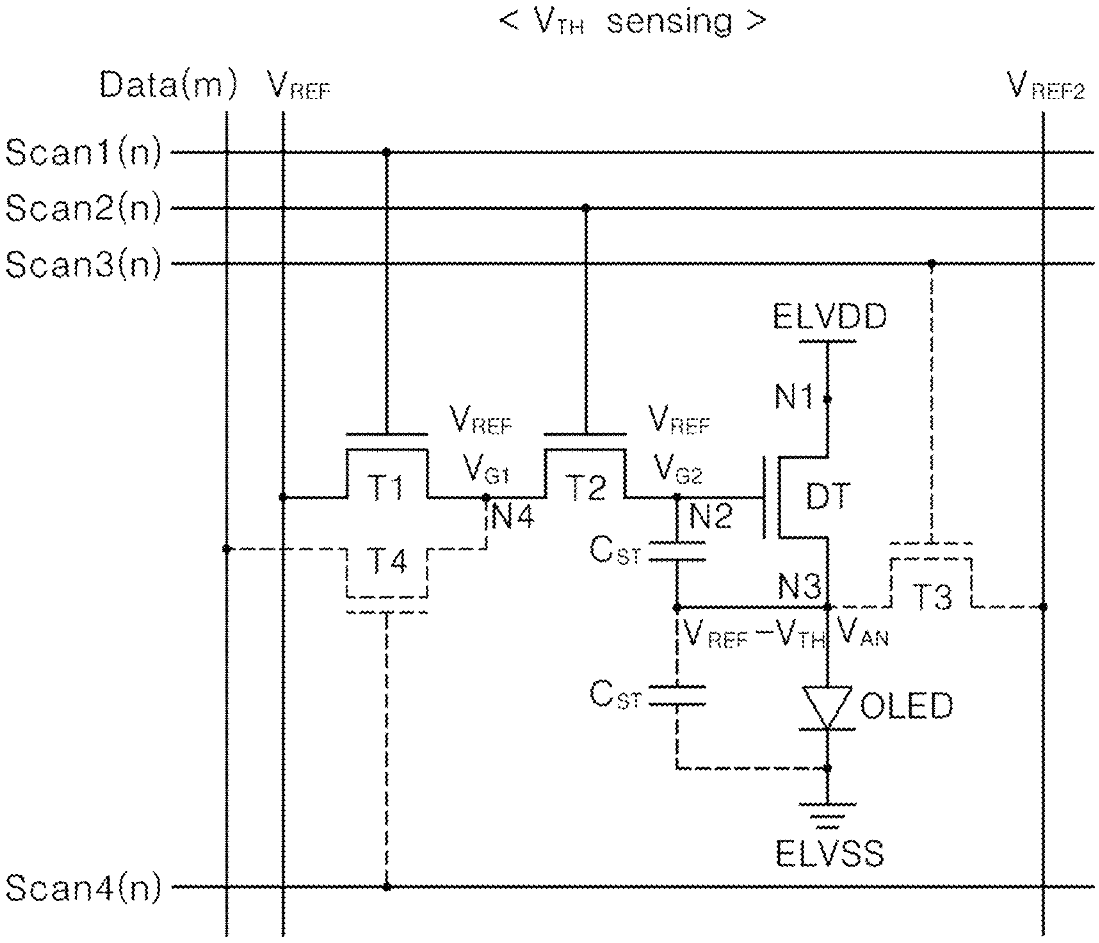
FIG. 7A and FIG. 7B are diagrams showing an operation of each transistor and signal waveforms during a threshold voltage sensing period according to an exemplary embodiment of the present disclosure.
Figure 7B:
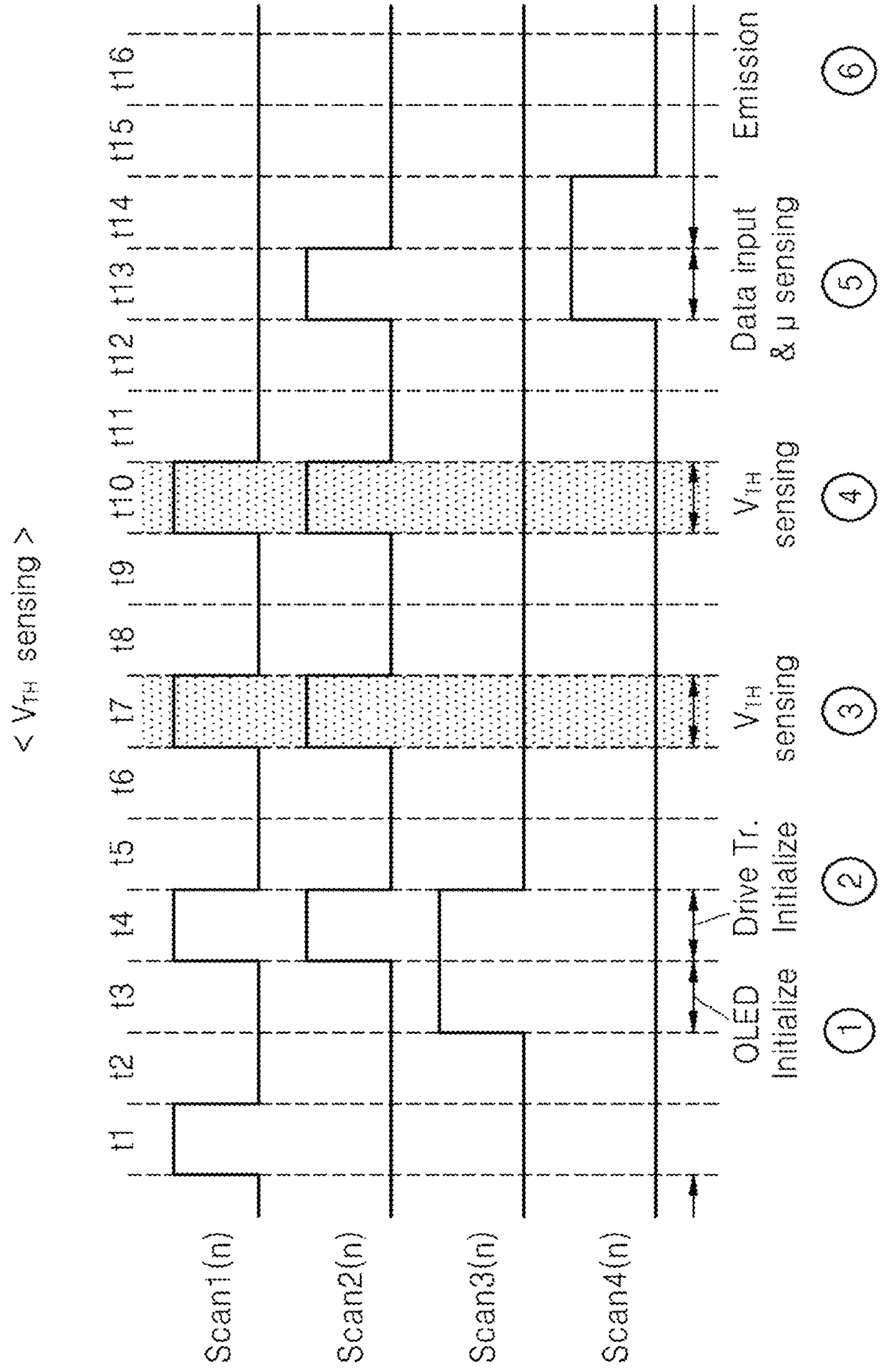

FIG. 7A and FIG. 7B are diagrams showing an operation of each transistor and signal waveforms during a threshold voltage sensing period according to an exemplary embodiment of the present disclosure.

Referring to FIG. 7A and FIG. 7B, during the threshold voltage sensing periods ($V_{TH}$ sensing) ③ and ④ according to an exemplary embodiment of the present disclosure, the first scan signal Scan1(*n*) of a high-level may be applied to the first gate electrode such that the first transistor T1 is turned on, while the second scan signal Scan2[*n*] of a high-level may be applied to the second gate electrode such that the second transistor T2 is turned on.

Accordingly, the first reference voltage $V_{REF}$ is applied to the gate electrode of the driving transistor DT through the first transistor T1 and the second transistor T2.

Therefore, as the threshold voltage between the gate electrode and the source electrode of the driving transistor DT is sensed, the threshold voltage $V_{TH}$ of the driving transistor DT is compensated for.

At this time, the third scan signal Scan3(*n*) of a low-level is applied to the third transistor T3 via the third scan line Scan3, while the fourth scan signal Scan4(*n*) of a low-level is applied to the fourth transistor T4 via the fourth scan line Scan4, such that the third transistor T3 and the fourth transistor T4 are turned off, respectively.

The voltage $V_{AN}$ of the anode electrode of the organic light-emitting element OLED may become a voltage ($V_{REF}-V_{TH}$) obtained by subtracting the threshold voltage $V_{TH}$ of the driving transistor DT from the first reference voltage $V_{REF}$.

At this time, the driving transistor DT executes a source follower operation, and the voltage difference across the storage capacitor $C_{ST}$ may become the threshold voltage $V_{TH}$.

As shown in FIG. 7A and FIG. 7B, regarding the threshold voltage sensing periods ($V_{TH}$ sensing) ③ and ④, after a certain horizontal period, for example, at the seventh time t7, a first threshold voltage sensing period may occur, and then, after two horizontal periods (2H), for example, at the tenth time t10, a second threshold voltage sensing period may occur. In this way, the threshold voltage sensing period may be repeated at least once.

In this regard, the compensation rate for the threshold voltage $V_{TH}$ of the driving transistor DT may vary based on the number of times at which the first scan signal Scan1(*n*) and the second scan signal Scan2(*n*) having the high-level overlap each other, or based on the number of repetitions of the driving signal.

Therefore, it may be identified that the compensation rate for the threshold voltage $V_{TH}$ of the driving transistor DT increases as the number of repetitions of the driving signal increases during the threshold voltage sensing period ($V_{TH}$ sensing).

Figure 8A:
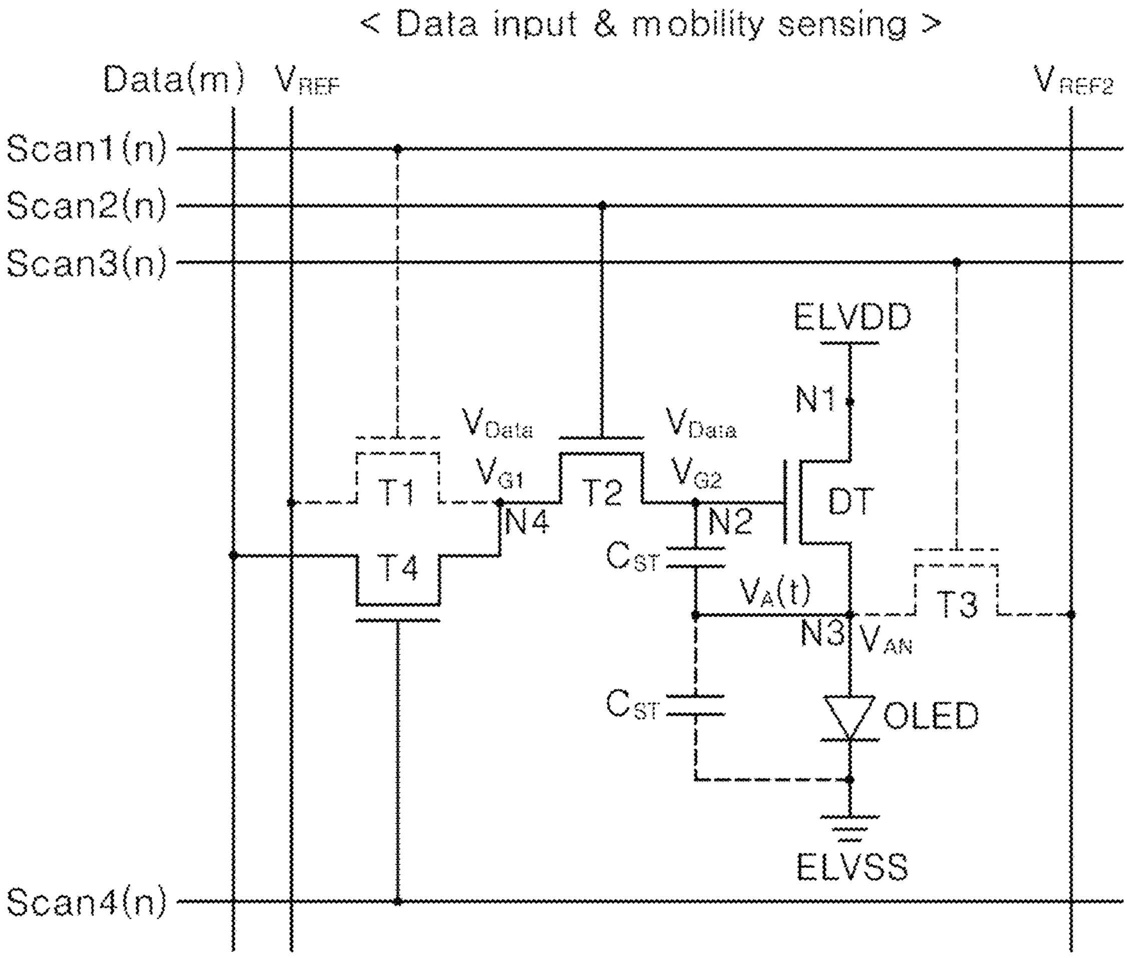
FIG. 8A and FIG. 8B are diagrams showing an operation of each transistor and signal waveforms during a data input time and mobility sensing period according to an exemplary embodiment of the present disclosure.
Figure 8B:
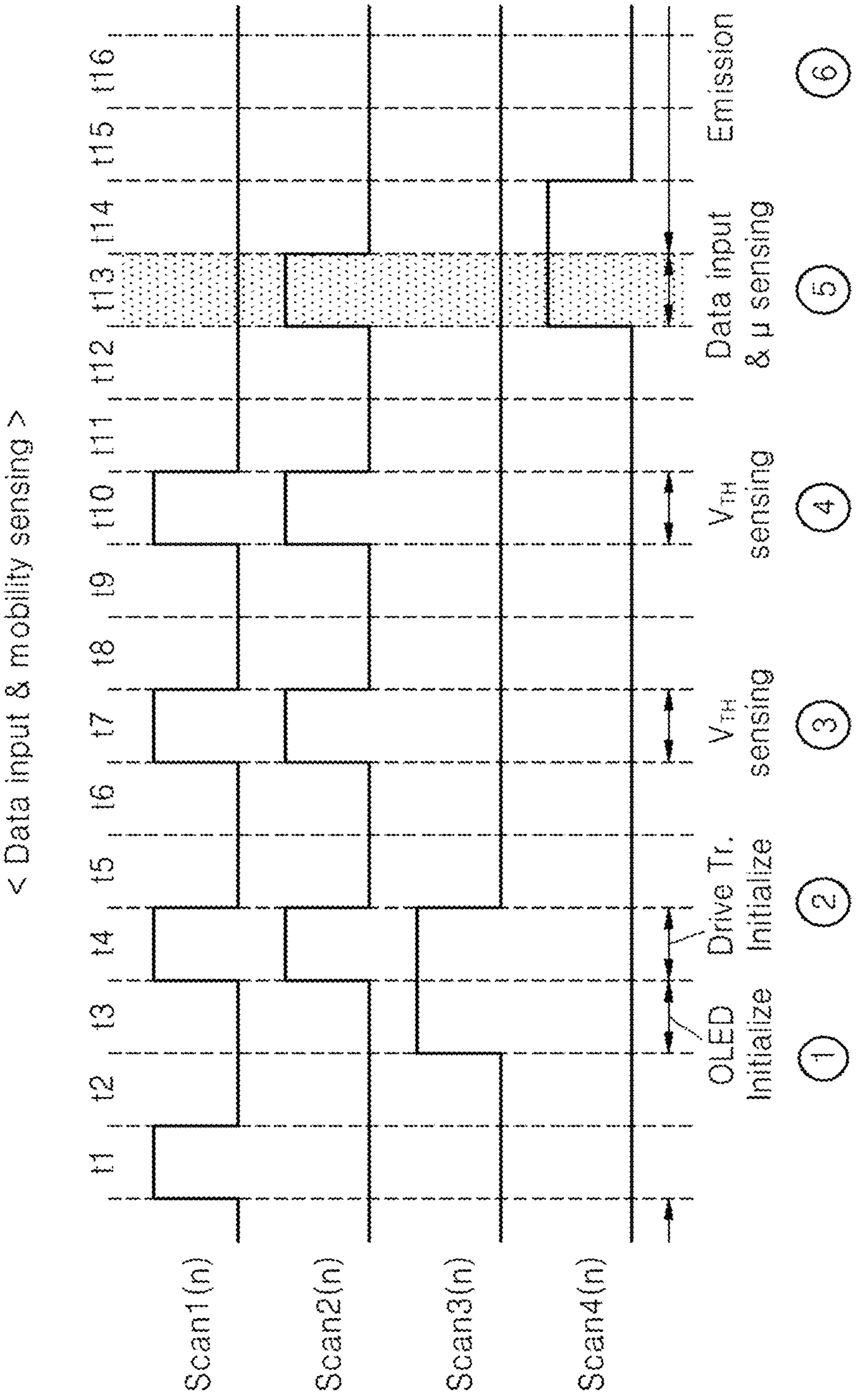

FIG. 8A and FIG. 8B are diagrams showing an operation of each transistor and signal waveforms during a data input time and mobility sensing period according to an exemplary embodiment of the present disclosure.

Referring to FIG. 8A and FIG. 8B, during the data input time and mobility sensing period (Data input & μ sensing) ⑤ according to an exemplary embodiment of the present disclosure, the second scan signal Scan2(*n*) of a high-level is applied to the second gate electrode such that the second transistor T2 is turned on, while the fourth scan signal Scan4(*n*) of a high-level is applied to the fourth gate electrode to turn on the fourth transistor T4.

Therefore, the data voltage Data(m) is applied to the gate electrode of the driving transistor DT through the fourth transistor T4 and the second transistor T2.

In this regard, the voltage of the gate electrode of the driving transistor DT, that is, the voltage of the second node N2 has the data voltage $V_{Data}$.

The storage capacitor $C_{ST}$ is connected to and disposed between the gate electrode of the driving transistor DT and the anode electrode of the organic light-emitting element OLED. That is, the first electrode of the storage capacitor $C_{ST}$ is connected to the gate electrode of the driving transistor DT, while the second electrode of the storage capacitor $C_{ST}$ is connected to the anode electrode of the organic light-emitting element OLED. Therefore, a first capacitance of the storage capacitor $C_{ST}$ acts between the gate electrode of the driving transistor DT and the anode electrode of the organic light-emitting element OLED.

Moreover, a second capacitance acts between the second electrode of the storage capacitor $C_{ST}$ and the cathode electrode of the organic light-emitting element OLED as if a second capacitor $C_{OLED}$ as a parasitic organic light-emitting element capacitor is disposed between and connected to the second electrode of the storage capacitor $C_{ST}$ and the cathode electrode of the organic light-emitting element OLED.

Therefore, the voltage $V_{AN}$ of the anode electrode of the organic light-emitting element OLED connected to the second electrode of the storage capacitor $C_{ST}$ may be calculated using the first capacitance value of the storage capacitor $C_{ST}$ as the first capacitor, the second capacitance value of the organic light-emitting element capacitor $CO_{LED}$ as the second capacitor, the data voltage $V_{Data}$, and the voltage obtained by subtracting the threshold voltage $V_{TH}$ from the first reference voltage $V_{REF}$ based on a following Equation 1:

$$V_{AN} = \frac{C_{ST}}{C_{ST} + C_{OLED}} V_{Data} + \frac{C_{OLED}}{C_{ST} + C_{OLED}} [V_{REF} - V_{TH}] \quad \text{Equation 1}$$

That is, the voltage $V_{AN}$=VA(t) of the anode electrode of the organic light-emitting element OLED may be calculated by dividing a value obtained by multiplying the first capacitance $C_{ST}$ and the data voltage $V_{Data}$ by a value obtained by adding the first capacitance $C_{ST}$ and the second capacitance $CO_{LED}$ to each other to produce a first value, subtracting the threshold voltage $V_{TH}$ from the first reference voltage $V_{REF}$ to produce a second value, and then dividing a value obtained by multiplying the second capacitance $CO_{LED}$ and the second value by a value obtained by adding the first capacitance $C_{ST}$ and the second capacitance $C_{OLED}$ to each other to produce a third value, and then adding the first value and third value.

For example, the second capacitance $C_{OLED}$ is 2 pF, and the first capacitance $C_{ST}$ is 0.2 pF. The voltage $V_{G2}$ of the gate electrode of the driving transistor DT is the data voltage $V_{Data}$. In this case, the voltage $V_{AN}$=VA(t) of the anode electrode of the organic light-emitting element OLED may be calculated as 0.09× data voltage $V_{Data}$+0.91×[first reference voltage $V_{REF}$−threshold voltage $V_{TH}$]. Therefore, the voltage difference across the storage capacitor $C_{ST}$ may be 0.91×[data voltage $V_{Data}$−first reference voltage $V_{REF}$]+0.91×threshold voltage $V_{TH}$.

Regarding the sensing of the mobility between the gate electrode and the source electrode of the driving transistor DT, it may be identified that the voltage $V_{AN}$ of the anode electrode of the organic light-emitting element OLED varies based on variation in the mobility between the gate electrode and the source electrode of the driving transistor DT within a predefined time.

In this case, when the mobility is high, the voltage $V_{AN}$ of the anode electrode of the organic light-emitting element OLED is quickly charged to a high-level, and decreases relatively from the high-level to the voltage VGS between the gate electrode and the source electrode of the driving transistor DT. In this regard, the voltage VGS between the gate electrode and the source electrode of the driving transistor DT is a voltage ($V_{Data}$−VA(t)) obtained by subtracting the voltage VA(t) of the anode electrode of the organic light-emitting element OLED from the data voltage $V_{Data}$.

Moreover, when the mobility is low, the voltage $V_{AN}$ of the anode electrode of the organic light-emitting element OLED is charged slowly to a low-level, and increases relatively from the low-level to the voltage VGS between the gate electrode and the source electrode of the driving transistor DT. In this regard, the voltage VGS between the gate electrode and the source electrode of the driving transistor DT is a voltage ($V_{Data}$−VA(t)) obtained by subtracting the voltage VA(t) of the anode electrode of the organic light-emitting element OLED from the data voltage $V_{Data}$.

Figure 9A:
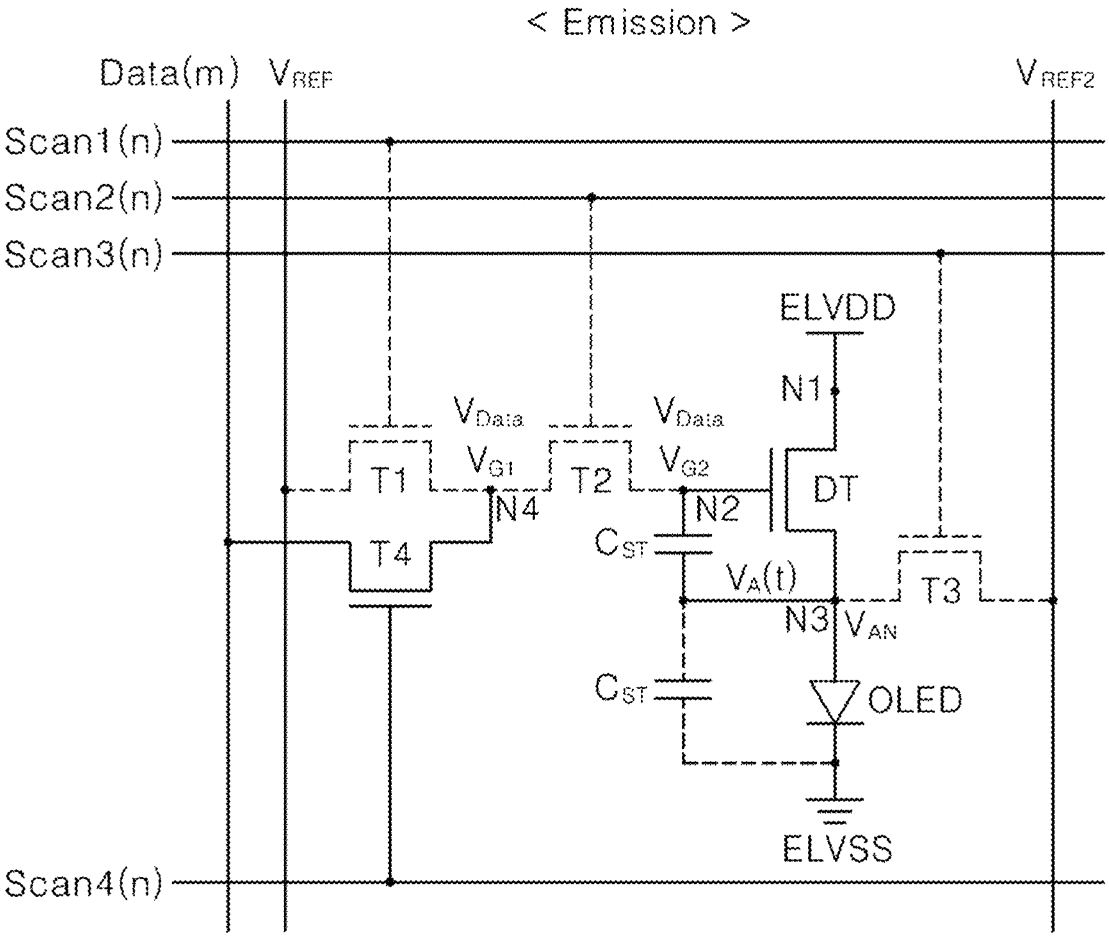
FIGS. 9A and 9B are diagrams showing an operation of each transistor and signal waveforms during an emission period according to an exemplary embodiment of the present disclosure.
Figure 9B:
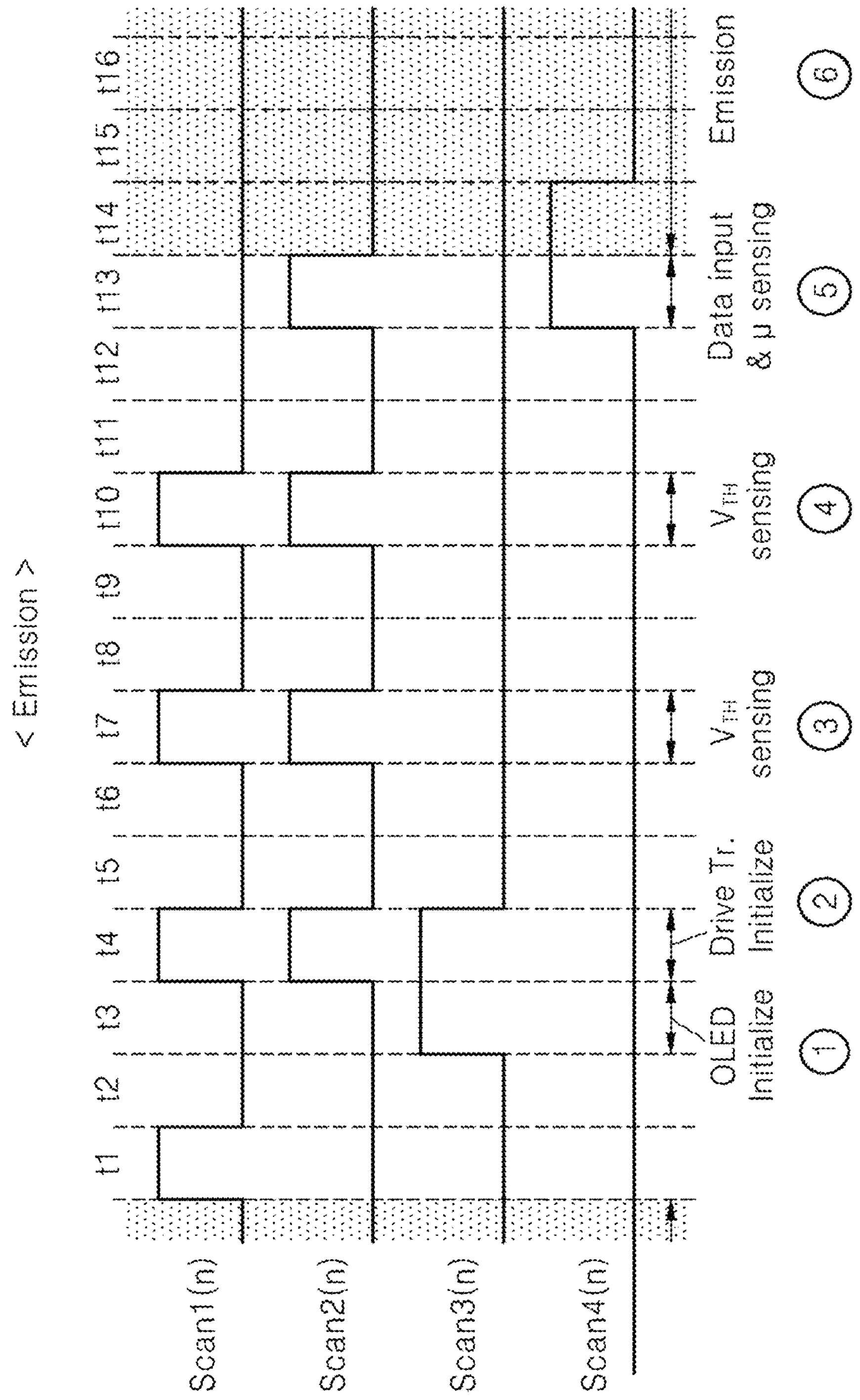

FIGS. 9A and 9B are diagrams showing an operation of each transistor and signal waveforms during an emission period according to an exemplary embodiment of the present disclosure.

Referring to FIG. 9A and FIG. 9B, during the emission period ⑥ according to an exemplary embodiment of the present disclosure, the fourth scan signal Scan4(*n*) is applied, as a high-level pulse signal, to the fourth gate electrode of the fourth transistor T4 via the fourth scan signal line Scan4 at the 14-th time t14 to turn on the fourth transistor T4.

Accordingly, the data voltage Data(m) is applied to the fourth node N4 through the fourth transistor T4 via the data line Data.

In this regard, a voltage $V_{G2}$ of the second node N2 as the gate electrode of the driving transistor DT becomes a sum of the data voltage $V_{Data}$ and a voltage $V_B$ between the second electrode of the storage capacitor $C_{ST}$ and the anode electrode of the organic light-emitting element OLED.

Therefore, the voltage of the gate electrode of the driving transistor DT becomes higher than the threshold voltage such that the driving transistor DT is turned on, and the data power ELVDD is applied from the first node N1 to the third node N3.

A current $I_{DT}$ flowing through the driving transistor DT may be calculated as based on a following Equation 2:

$$I_{DT} = \mu_n C_{OX} \frac{W}{L} \left( \frac{C_{OLED}}{C_{ST} + C_{OLED}} (V_{Data} - V_{TH} - V_B) \right)^2 \quad \text{Equation 2}$$

In the Equation 2, n denotes the mobility of the driving transistor DT, and $C_{ox}$ denotes an oxide capacitance value per unit area. Moreover, W represents a width of the driving transistor DT, and L represents a length of the driving transistor DT. Moreover, $C_{ST}$ represents the first capacitance value of the storage capacitor as the first capacitor, and $CO_{LED}$ represents the second capacitance value of the organic light-emitting element capacitor as the second capacitor. Moreover, $V_{TH}$ represents the threshold voltage of the driving transistor DT, $V_{Data}$ represents the data voltage, and $V_B$ represents the voltage between the second electrode of the storage capacitor CST and the anode electrode of the organic light-emitting element OLED.

In this regard, the data power ELVDD flows to the cathode electrode through the anode electrode of the organic light-emitting element OLED in contact with the third node N3 and then via the organic light-emissive layer.

When current flows through the organic light-emissive layer of the organic light-emitting element OLED, holes passing through the hole-transporting layer HTL and electrons passing through the electron-transporting layer ETL move to the organic light-emissive layer, and are combined with each other such that excitons are generated. As a result, the organic light-emissive layer emits visible light, and thus the organic light-emitting element OLED emits light.

Figure 10A:
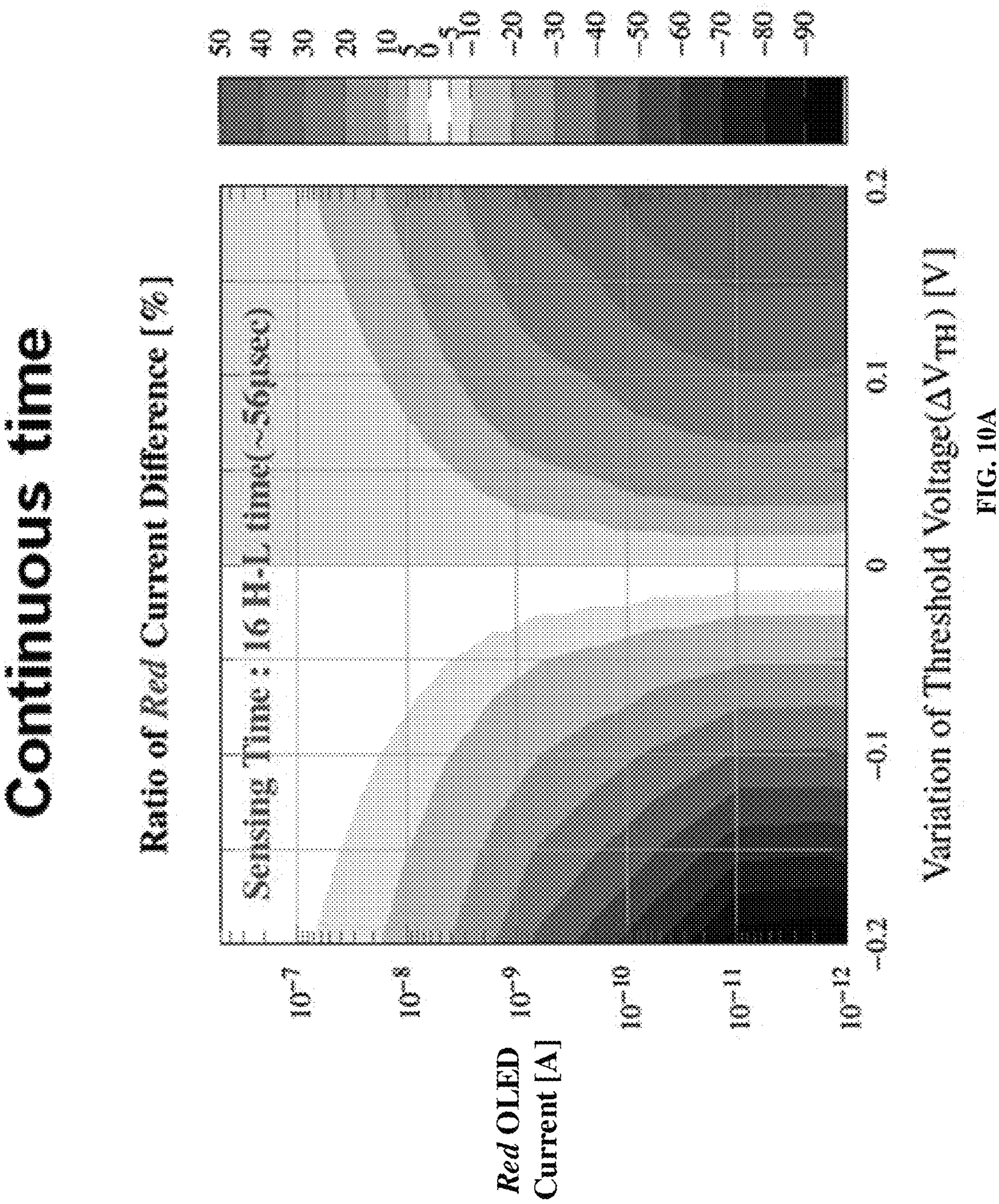
FIGS. 10A and 10B are diagrams comparing a result of continuously applying a driving signal with a result of discretely applying a driving signal during a threshold voltage sensing period in a display device according to an exemplary embodiment of the present disclosure.
Figure 10B:
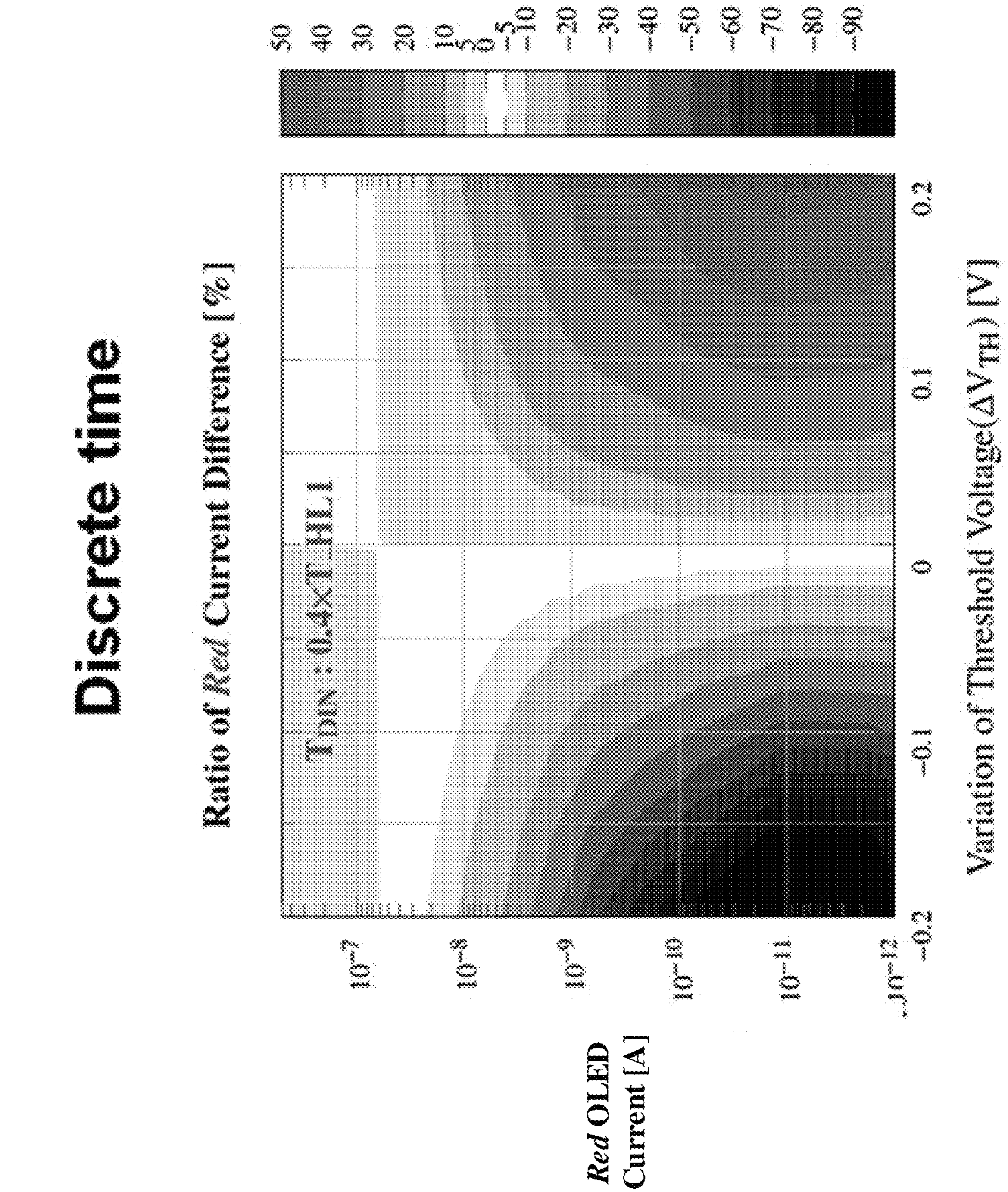

FIG. 10A is a diagram of a result (Continuous time) of continuously applying a driving signal and FIG. 10B is a result (Discrete time) of discretely applying a driving signal during a threshold voltage sensing period in a display device according to an exemplary embodiment of the present disclosure.

Referring to FIGS. 10 and 10B, it may be identified that in the display device 100 according to an exemplary embodiment of the present disclosure, a current difference when the driving signal is applied to the driving transistor DT of one pixel P as a pulse signal of 1 horizontal period (1H) in a repeated discrete manner during, for example, a 56 μs threshold voltage sensing period is similar to a current difference when the driving signal is applied to the driving transistor DT of one pixel P as a pulse signal of 16 horizontal periods (16H) in a continuous manner during, for example, a 56 μs threshold voltage sensing period, and thus the compensation rate in the discrete manner is similar to that in the continuous manner.

Accordingly, according to the present disclosure, the number of driving signals applied to the gate driver 30 is reduced, a structure in which 32 signal waveforms are required to create a pulse signal of 16 horizontal periods (16H) is not required.

Therefore, a thickness of the bezel may be reduced, and burden of the timing controller 20 related to driving signal generation may be reduced.

Figure 11A:
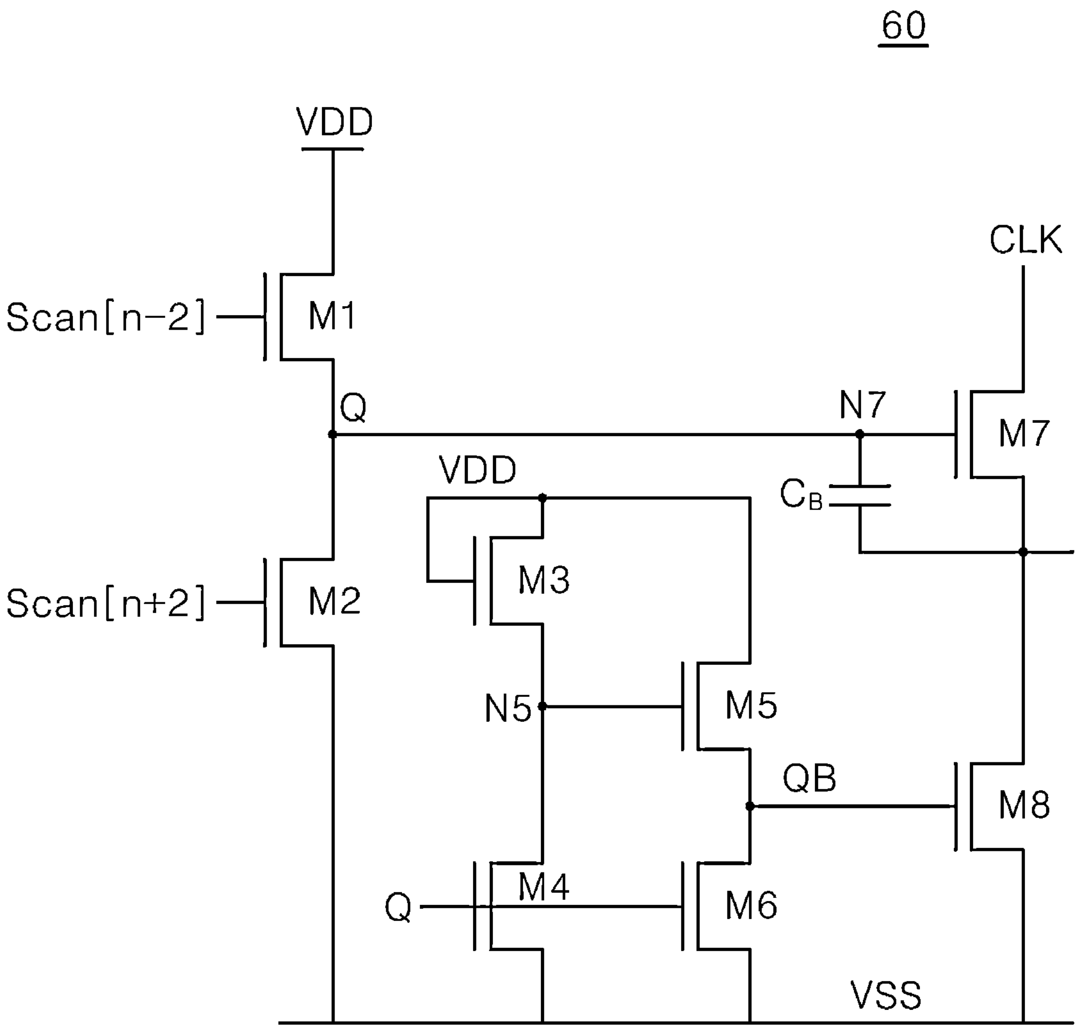
FIG. 11A is a diagram showing an example of an 8T1C circuit configuration of one stage in a gate driver according to an exemplary embodiment of the present disclosure.
Figure 11B:
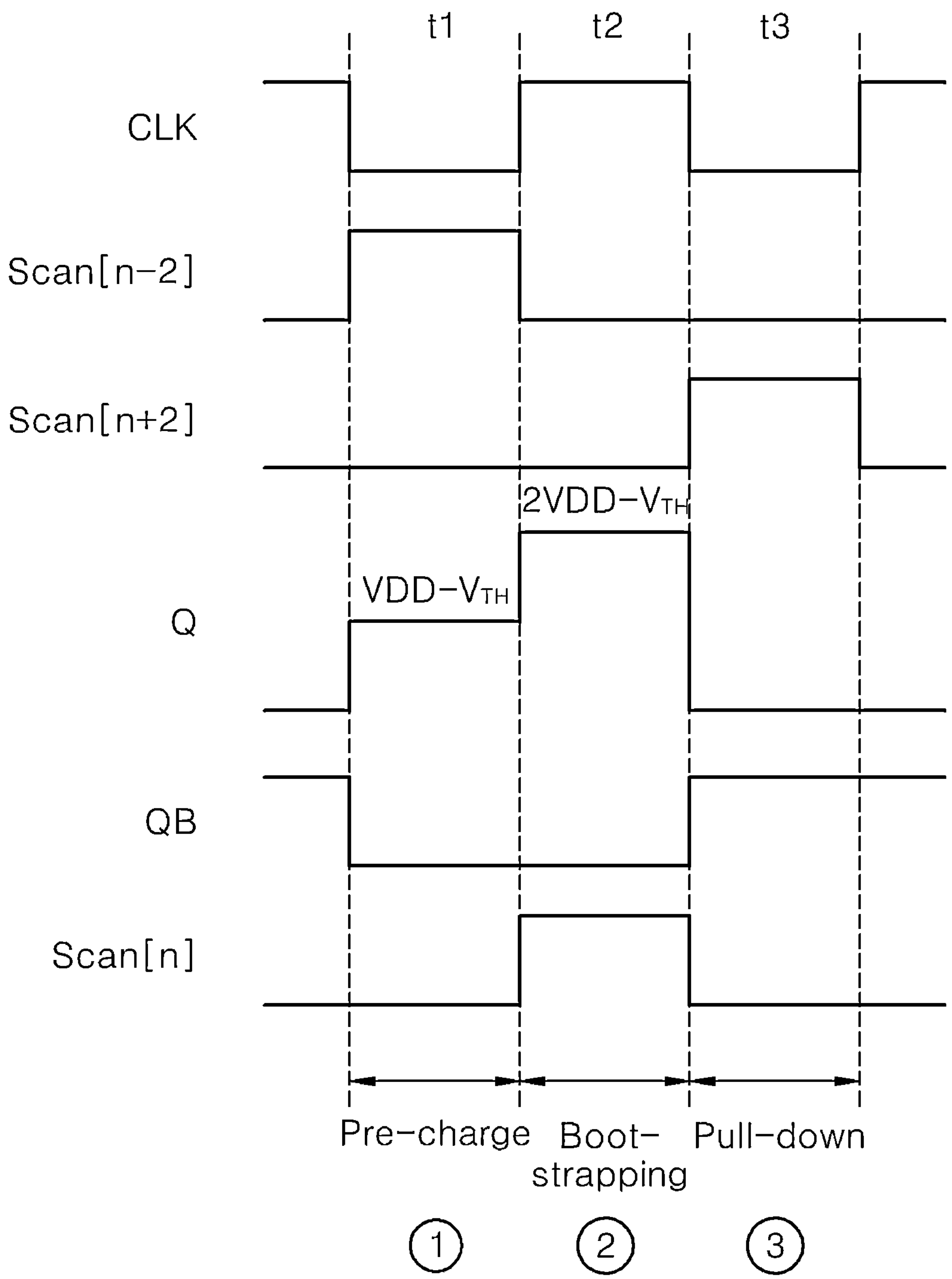
FIG. 11B is a diagram showing waveforms of a clock signal and a scan signal output from the stage of the 8T1C circuit configuration according to an exemplary embodiment of the present disclosure.

FIG. 11A is a diagram showing an example of an 8T1C circuit configuration of one stage in a gate driver according to an exemplary embodiment of the present disclosure. FIG. 11B is a diagram showing waveforms of a clock signal and a scan signal output from the stage of the 8T1C circuit configuration according to an exemplary embodiment of the present disclosure.

The gate driver 30 according to an exemplary embodiment of the present disclosure generates one or more gate signals (or scan signals) based on the gate control signal GCS. For example, the gate driver 30 generates and outputs the first scan signal SCAN1 and the second scan signal SCAN2, and the light-emission signal EM to each pixel P in FIG. 1. During an active period, the gate driver 30 generates the scan signals and the light-emission signal in a row-sequence scheme and sequentially provides the same to the gate line GL connected to each pixel line. Supply of the scan signals and the light-emission signal of the gate line GL is synchronized with supply of the data voltage of the data line DL. Each of the scan signals and the light-emission signal swings between the gate on voltage VGL and the gate off voltage VGH.

The gate driver 30 may include the plurality of stages STk 60 that sequentially output a gate pulse (or a scan pulse). For example, the gate driver 30 includes a shift register, a level shifter for converting an output signal of the shift register into a single having a swing width suitable for an operation of a thin-film transistor of each pixel, and an output buffer connected to and disposed between the level shifter and the gate lines GL. The gate driver may sequentially output the gate (scan) pulse having a pulse width of about 1 horizontal period.

A start signal VST swinging between a gate high voltage VGH and a gate low voltage VGL, a shift clock CLK1 to CLK3 (hereinafter referred to simply as a clock), etc. may be input to each stage STk.

The stages STk may start to output a second scan signal SCAN2 in response to the start signal VST, and may shift the output according to the clock CLK1 to GCLK3. The second scan signal SCAN2 sequentially output from the stages STk is supplied to the gate lines GL.

One or more of the scan signals of current stages may be input, as a start signal, to at least one of next stages and may be further input, as a reset signal, to one of previous stages. The stage STk may output a carry signal CRY separate from the scan signal, and may supply the carry signal, as a control signal, to the previous stage or the next stage. For example, the carry signal may be supplied to the next stage as a start signal or may be supplied to the previous stage as a reset signal.

Referring to FIGS. 11A and 11B, one stage STk 60 in the gate driver 30 according to an exemplary embodiment of the present disclosure has, for example, an 8T1C structure including a first switch M1 controlling a Q node, and a second switch M2 to a sixth switch M6 controlling a QB node, and a seventh switch M7 and an eighth switch M8 controlling an output.

Each of the first switch M1 to the eighth switch M8 may be implemented as a n-type MOSFET NMOS or a p-type MOSFET PMOS.

Moreover, each of the first switch M1 to the eighth switch M8 may be implemented as an oxide thin-film transistor or a low-temperature polycrystalline silicon (LTPS) thin-film transistor.

The first switch M1 has a first electrode connected to a high-potential driving voltage line transmitting a high-potential driving voltage VDD, a gate electrode connected to a first scan signal line Scan1 transmitting an (N−2)-th scan signal Scan[n−2], and a second electrode connected to the Q node. One of the first electrode and the second electrode may act as a source electrode, while the other of the first electrode and the second electrode may act as a drain electrode.

The second switch M2 has a first electrode connected to the Q node, a gate electrode connected to a second scan signal line Scan2 transmitting an (N+2)-th scan signal Scan[n+2], and a second electrode connected to a low-potential driving voltage line that transmits a low-potential driving voltage VSS. One of the first electrode and the second electrode may act as a source electrode, while the other of the first electrode and the second electrode may act as a drain electrode.

The third switch M3 has a first electrode connected to the high-potential driving voltage line transmitting the high-potential driving voltage VDD, a gate electrode connected to the high-potential driving voltage line, and a second electrode connected to a fifth node N5 as a connection point between the fourth switch M4 and the fifth switch M5. One of the first electrode and the second electrode may act as a source electrode, while the other of the first electrode and the second electrode may act as a drain electrode.

The fourth switch M4 has a first electrode connected to the fifth node N5 as the connection point between the third switch M3 and the fifth switch M5, a gate electrode connected to the Q node, and a second electrode connected to the low-potential driving voltage line that transmits the low-potential driving voltage VSS. One of the first electrode and the second electrode may act as a source electrode, while the other of the first electrode and the second electrode may act as a drain electrode.

The fifth switch M5 has a first electrode connected to the high-potential driving voltage line transmitting a high-potential driving voltage VDD, a gate electrode connected to the fifth node N5 as the connection point of the third switch M3 and the fifth switch M5, and a second electrode connected to the QB node. One of the first electrode and the second electrode may act as a source electrode, while the other of the first electrode and the second electrode may act as a drain electrode.

The sixth switch M6 has a first electrode connected to the QB node, a gate electrode connected to the Q node, and a second electrode connected to the low-potential driving voltage line that transmits the low-potential driving voltage VSS. One of the first electrode and the second electrode may act as a source electrode, while the other of the first electrode and the second electrode may act as a drain electrode.

The seventh switch M7 has a first electrode connected to a clock signal line transmitting the clock signal CLK, a gate electrode connected to the Q node, and a second electrode connected to the eighth switch M8 and a scan output line Scan[n]. One of the first electrode and the second electrode may act as a source electrode, while the other of the first electrode and the second electrode may act as a drain electrode. A capacitor CB may be connected to and disposed between the gate electrode and the second electrode of the seventh switch M7.

The eighth switch M8 has a first electrode connected to the seventh switch M7 and the scan output line Scan[n], a gate electrode connected to the QB node, and a second electrode connected to the low-potential driving voltage line transmitting the low-potential driving voltage VSS. One of the first electrode and the second electrode may act as a source electrode, while the other of the first electrode and the second electrode may act as a drain electrode.

In the stage STk 60 of the above configuration, during a pre-charge period, the clock signal CLK is at a low-level, the (n−2)-th scan signal Scan[n−2] is at a high-level, and the (N+2)-th scan signal Scan[n+2] is at a low-level, such that the first switch M1 is turned on.

Therefore, the high-potential driving voltage VDD is applied to the Q node through the first switch M1, and a voltage of the Q node becomes a voltage (VDD−$V_{TH}$) obtained by subtracting the threshold voltage $V_{TH}$ from the high-potential driving voltage VDD. At this time, the QB node is in a low-level state.

Subsequently, during a boot-strapping period, the clock signal CLK is at a high-level, and each of the (n−2)-th scan signal Scan[n−2] and the (n+2)-th scan signal Scan[n+2] is at a low-level, and the Q node is at a high-level, such that the seventh switch M7 is turned on.

Accordingly, the high-level clock signal CLK is output to the scan output line Scan[n] through the seventh switch M7, such that the scan output line Scan[n] becomes a high-level state.

At this time, the voltage of the Q node connected to the gate electrode of the seventh switch M7 becomes a voltage (2VDD−$V_{TH}$) obtained by subtracting the threshold voltage $V_{TH}$ from two times of the high-potential driving voltage 2VDD.

In one example, during a pull-down period, the clock signal CLK is at a low-level, the (n−2)-th scan signal Scan[n−2] is at a low-level, and the (n+2)-th scan signal Scan[n+2] is at a high-level, so that the second switch M2 is turned on.

Accordingly, the low-potential driving voltage VSS is applied to the Q node via the second switch M2 through the low-potential driving voltage (VSS) line connected to the second electrode of the second switch M2, such that the fourth switch M4 and the sixth switch M6 are turned on.

At this time, the low-potential driving voltage VSS is applied to the QB node via the sixth switch M6, such that the QB node becomes a high-level state. Accordingly, the eighth switch M8 is turned on.

Therefore, the low-potential driving voltage VSS is output to the scan output line Scan[n] via the eighth switch M8, such that the scan output line Scan[n] becomes a low-level state.

As described above, one stage STk 60 in the gate driver 30 according to an exemplary embodiment of the present disclosure may adjust the waveform of the output signal via adjustment of the waveform of the carry input signal. That is, the applied clock signal is not changed.

Figure 12A:
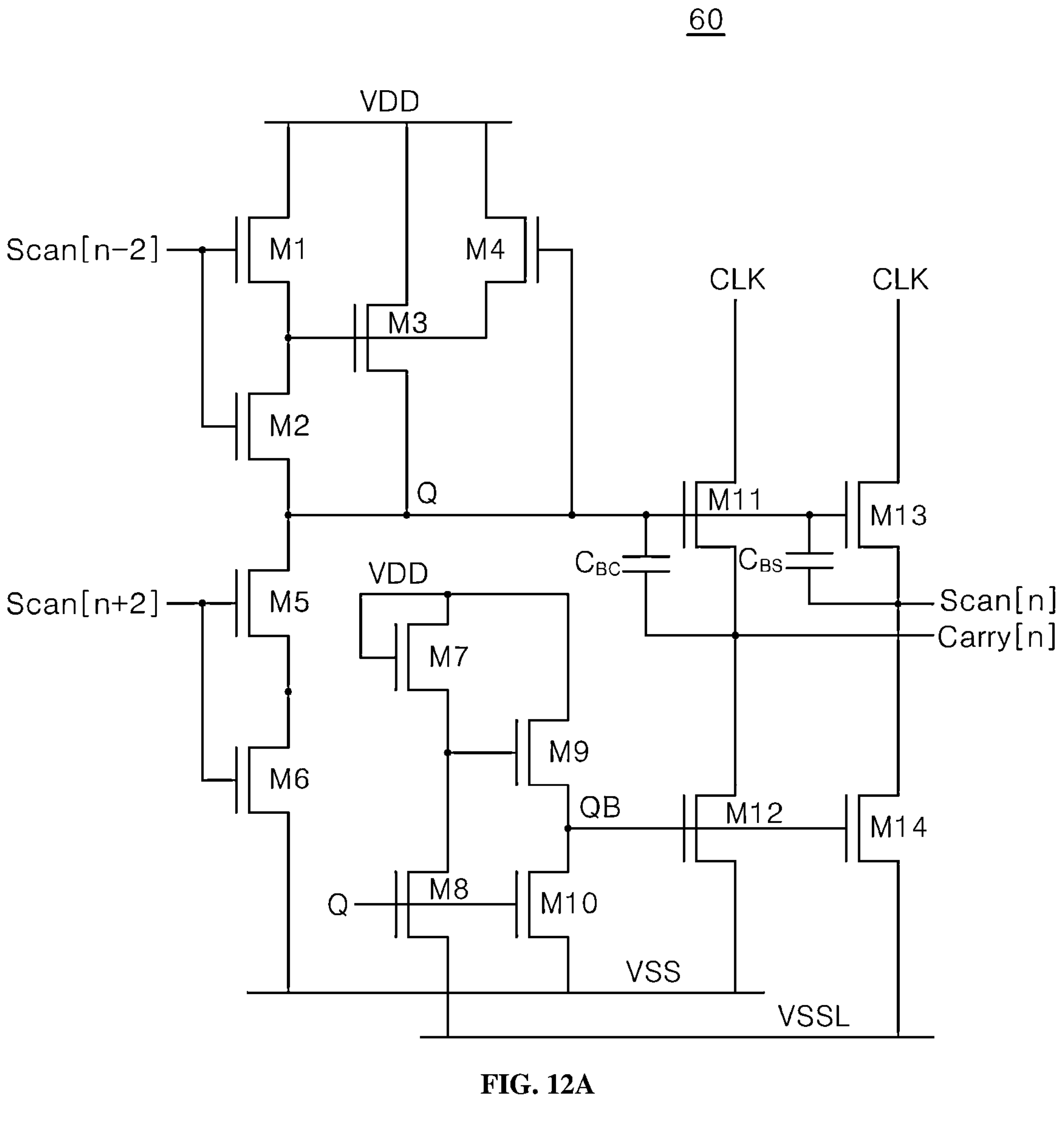
FIG. 12A is a diagram showing an example of a 14T2C circuit configuration of one stage in a gate driver according to an exemplary embodiment of the present disclosure.
Figure 12B:
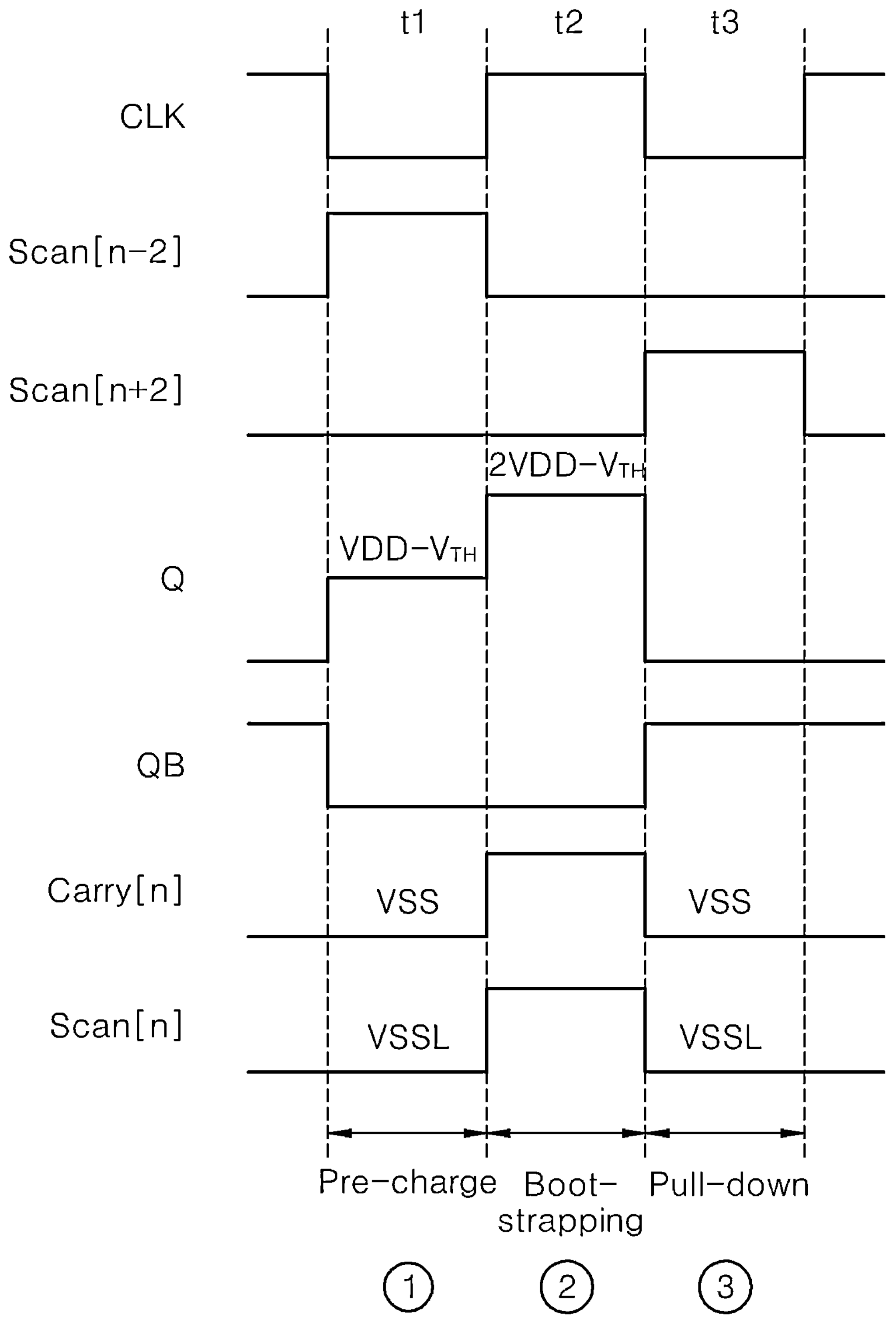
FIG. 12B is a diagram showing waveforms of a clock signal and a scan signal output from the stage of the 14T2C circuit configuration according to an exemplary embodiment of the present disclosure.

FIG. 12A is a diagram showing an example of a 14T2C circuit configuration of one stage in a gate driver according to an exemplary embodiment of the present disclosure. FIG. 12B is a diagram showing waveforms of a clock signal and a scan signal output from the stage of the 14T2C circuit configuration according to an exemplary embodiment of the present disclosure.

Referring to FIGS. 12A and 12B, one stage STk 60 in the gate driver 30 according to an exemplary embodiment of the present disclosure has, for example, a 14T2C structure including a first switch M1 to a fourth switch M4 controlling the Q node, a fifth switch M5 to a tenth switch M10 controlling the QB node and a 11-th switch M11 to a 14-th switch M14 to control the output.

Each of the first switch M1 to the 14-th switch M14 may be implemented as an n-type MOSFET NMOS or a p-type MOSFET PMOS.

Moreover, each of the first switch M1 to the 14-th switch M14 may be implemented as an oxide thin-film transistor or a low-temperature polysilicon (LTPS) thin-film transistor.

The first switch M1 has a first electrode connected to the high-potential driving voltage line transmitting the high-potential driving voltage VDD, a gate electrode connected to a first carry line Carry1 transmitting an (n−2)-th carry signal Carry[n−2], and a second electrode connected to the second switch M2. One of the first electrode and the second electrode may act as a source electrode, while the other of the first electrode and the second electrode may act as a drain electrode.

The second switch M2 has a first electrode connected to the first switch M1, a gate electrode connected to the first carry line Carry1 transmitting the (n−2)-th carry signal Carry[n−2], and a second electrode connected to the Q node. One of the first electrode and the second electrode may act as a source electrode, while the other of the first electrode and the second electrode may act as a drain electrode.

The third switch M3 has a first electrode connected to the high-potential driving voltage line transmitting the high-potential driving voltage VDD, a gate electrode connected to a connection point between the first switch M1 and the second switch M2, and a second electrode connected to the Q node. One of the first electrode and the second electrode may act as a source electrode, while the other of the first electrode and the second electrode may act as a drain electrode.

The fourth switch M4 has a first electrode connected to the high-potential driving voltage line transmitting a high-potential driving voltage VDD, a gate electrode connected to the Q node, and a second electrode connected to the connection point between the first switch M1 and the second switch M2. One of the first electrode and the second electrode may act as a source electrode, while the other of the first electrode and the second electrode may act as a drain electrode.

The fifth switch M5 has a first electrode connected to the Q node, a gate electrode connected to a second carry line Carry2 transmitting an (n+2)-th carry signal Carry[n+2], and a second electrode connected to the sixth switch M6. One of the first electrode and the second electrode may act as a source electrode, while the other of the first electrode and the second electrode may act as a drain electrode.

The sixth switch M6 has a first electrode connected to the fifth switch M5, a gate electrode connected to the second carry line Carry2 transmitting the (n+2)-th carry signal Carry[n+2], and a second electrode connected to the low-potential driving voltage line that transmits the low-potential driving voltage VSS. One of the first electrode and the second electrode may act as a source electrode, while the other of the first electrode and the second electrode may act as a drain electrode.

The seventh switch M7 has both a first electrode and a gate electrode connected to the high-potential driving voltage line transmitting the high-potential driving voltage VDD, and a second electrode connected to the eighth switch M8 and the ninth switch M9. One of the first electrode and the second electrode may act as a source electrode, while the other of the first electrode and the second electrode may act as a drain electrode.

The eighth switch M8 has a first electrode connected to the seventh switch M7 and the ninth switch M9, a gate electrode connected to the Q node, and a second electrode connected to the low-potential driving voltage line transmitting the low-potential driving voltage VSS. One of the first electrode and the second electrode may act as a source electrode, while the other of the first electrode and the second electrode may act as a drain electrode.

The ninth switch M9 has a first electrode connected to the high-potential driving voltage line transmitting a high-potential driving voltage VDD, a gate electrode connected to the seventh switch M7 and the eighth switch M8, and a second electrode connected to the QB node. One of the first electrode and the second electrode may act as a source electrode, while the other of the first electrode and the second electrode may act as a drain electrode.

The tenth switch M10 has a first electrode connected to the QB node, a gate electrode connected to the Q node, and a second electrode connected to the low-potential driving voltage line transmitting the low-potential driving voltage VSS. One of the first electrode and the second electrode may act as a source electrode, while the other of the first electrode and the second electrode may act as a drain electrode.

The 11-th switch M11 has a first electrode connected to the clock signal line transmitting the clock signal CLK, a gate electrode connected to the Q node, and a second electrode connected to a carry output line Carry[n]. One of the first electrode and the second electrode may act as a source electrode, while the other of the first electrode and the second electrode may act as a drain electrode.

A capacitor CBC may be connected to and disposed between the gate electrode and the second electrode of the 11-th switch M11.

The 12-th switch M12 has a first electrode connected to the carry output line Carry[n], a gate electrode connected to the QB node, and a second electrode connected to the low-potential driving voltage line that transmits the low-potential driving voltage VSS. One of the first electrode and the second electrode may act as a source electrode, while the other of the first electrode and the second electrode may act as a drain electrode.

The 13-th switch M13 has a first electrode connected to the clock signal line transmitting the clock signal CLK, a gate electrode connected to the Q node, and a second electrode connected to scan output line Scan[n]. One of the first electrode and the second electrode may act as a source electrode, while the other of the first electrode and the second electrode may act as a drain electrode.

A capacitor CBS may be connected to and disposed between the gate electrode and the second electrode of the 13-th switch M13.

The 14-th switch M14 has a first electrode connected to the scan output line Scan[n], a gate electrode connected to the QB node, and a second electrode connected to the low-potential driving voltage line that transmits the low-potential driving voltage VSSL. One of the first electrode and the second electrode may act as a source electrode, while the other of the first electrode and the second electrode may act as a drain electrode.

In the stage STk 60 of the above configuration, during the pre-charge period, the clock signal CLK is at a low-level, and the (n−2)-th carry signal Carry[n−2] is at a high-level, such that the first switch M1 and the second switch M2 are turned on.

Therefore, the high-potential driving voltage VDD is applied to the Q node through the first switch M1 and the second switch M2, such that the voltage of the Q node becomes the voltage (VDD−$V_{TH}$) obtained by subtracting the threshold voltage $V_{TH}$ from the high-potential driving voltage VDD. At this time, the QB node is in a low-level state.

Subsequently, during the boot-strapping period, the clock signal CLK is at a high-level, each of the (n−2)-th carry signal Carry[n−2] and the (n+2)-th carry signal Carry[n+2] is at a low-level, and the Q node is at a high-level, such that the 11-th switch M11 and the 13-th switch M13 are turned on.

Therefore, the high-level clock signal CLK is output to the scan output line Scan[n] and the carry output line Carry[n] through the 11-th switch M11 and the 13-th switch M13, respectively, and thus each of the scan output line Scan[n] and the carry output line Carry[n] becomes a high-level state.

At this time, the voltage of the Q node connected to the gate electrode of each of the 11-th switch M11 and the 13-th switch M13 becomes a voltage (2VDD−$V_{TH}$) obtained by subtracting the threshold voltage $V_{TH}$ from two times of the high-potential driving voltage 2VDD. The QB node is in a low-level state. That is, the QB node is in a low-level state both during the pre-charge period and the boot-strapping period.

In one example, during the pull-down period, the clock signal CLK is at a low-level, and the (n−2)-th carry signal Carry[n−2] has a low-level, and the (n+2)-th carry signal Carry[n+2] has a high-level, so that the fifth switch M5 and the sixth switch M6 are turned on.

Accordingly, the low-potential driving voltage VSS is applied to the Q node via each of the fifth switch M5 and the sixth switch M6 through the low-potential driving voltage (VSS) line connected to the second electrode of each of the fifth switch M5 and the sixth switch M6. Thus, the eighth switch M8 and the tenth switch M10 are turned on.

At this time, the low-potential driving voltage VSS is applied to the QB node via the tenth switch M10, such that the QB node becomes a high-level state. Accordingly, the 12-th switch M12 and the 14-th switch M14 are turned on.

Therefore, the low-potential driving voltage VSS is output to the scan output line Scan[n] and the carry output line Carry[n] via the 12-th switch M12 and the 14-th switch M14, respectively, so that each of the scan output line Scan[n] and the carry output line Output line Carry[n] becomes a low-level state.

As described above, one stage STk 60 in the gate driver 30 according to an exemplary embodiment of the present disclosure may adjust the waveform of the output signal via adjustment of the waveform of the carry input signal. That is, the applied clock signal is not changed.

Figure 13A:
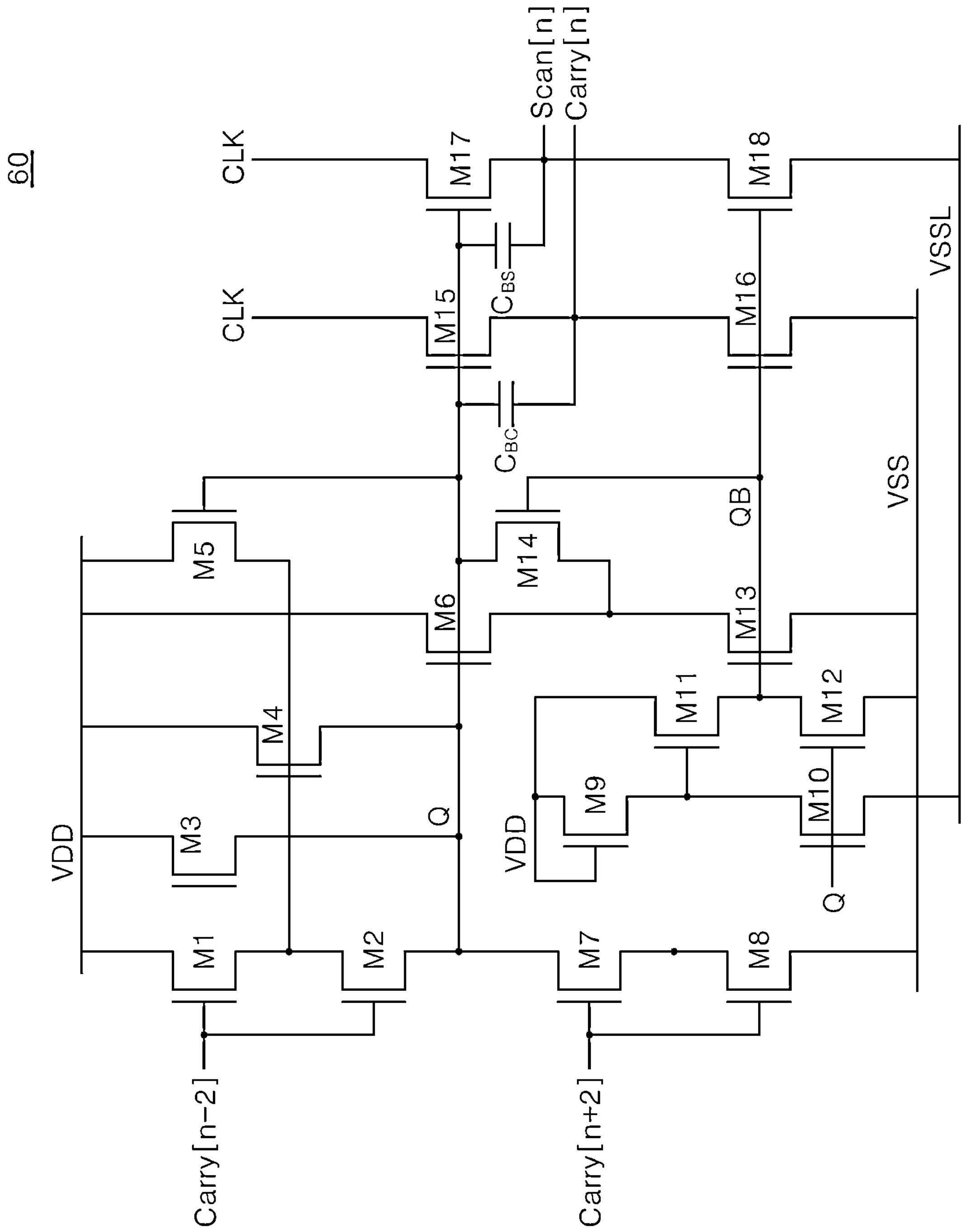
FIG. 13A is a diagram showing an example of a 18T2C circuit configuration of one stage in a gate driver according to an exemplary embodiment of the present disclosure.
Figure 13B:
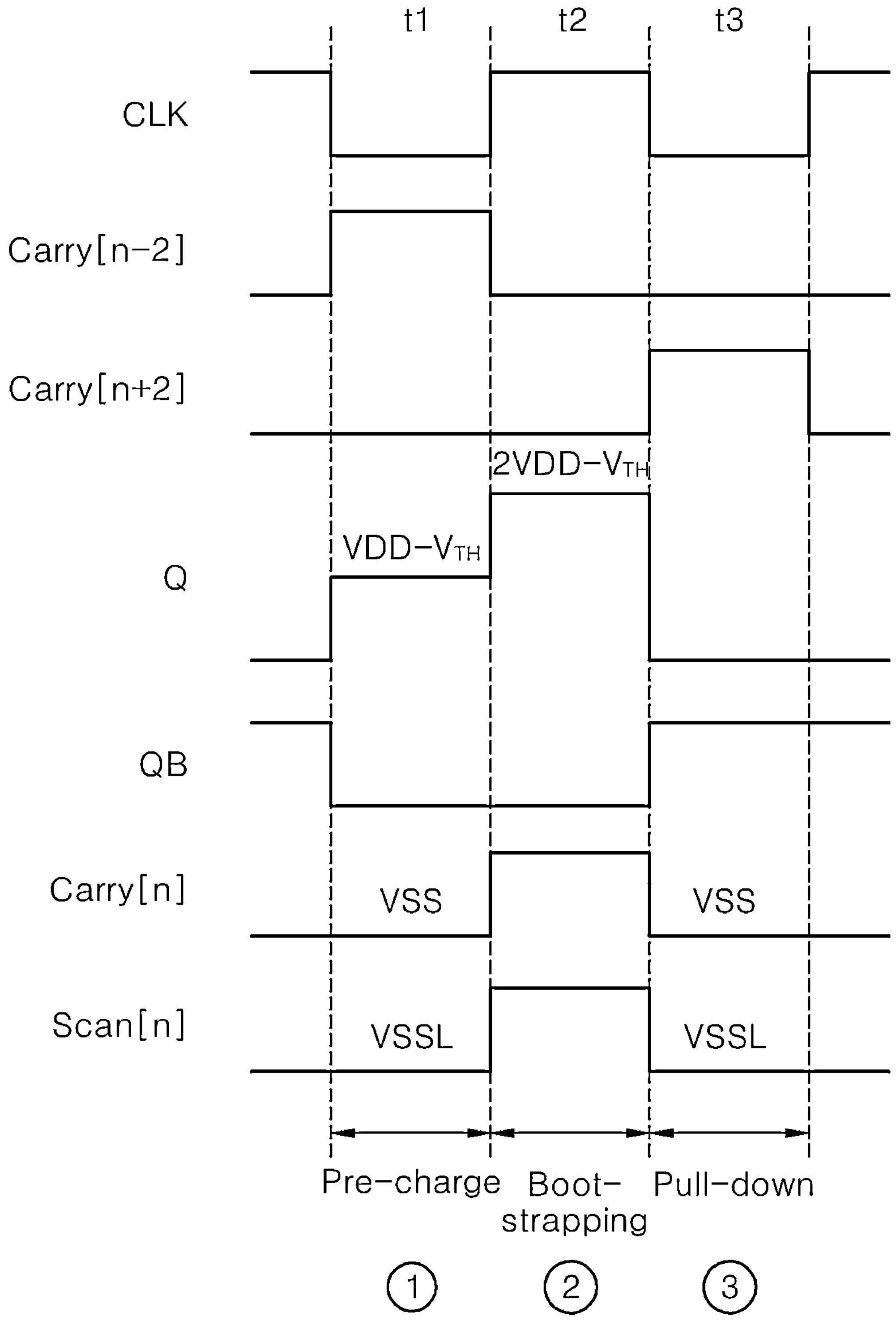
FIG. 13B is a diagram showing waveforms of a clock signal and a scan signal output from the stage of the 18T2C circuit configuration according to an exemplary embodiment of the present disclosure.

FIG. 13A is a diagram showing an example of a 18T2C circuit configuration of one stage in a gate driver according to an exemplary embodiment of the present disclosure. FIG. 13B is a diagram showing waveforms of a clock signal and a scan signal output from the stage of the 18T2C circuit configuration according to an exemplary embodiment of the present disclosure.

Referring to FIG. 13A and FIG. 13B, one stage STk 60 in the gate driver 30 according to an exemplary embodiment of the present disclosure has, for example, a 18T2C structure including a first switch M1 to a fifth switch M5 controlling the Q node, a sixth switch M6 to a 14-th switch M14 that controls the QB node, and a 15-th switch M15 to a 18-th switch M18 that controls the output.

Each of the first switch M1 to the 18-th switch M18 may be implemented as an n-type MOSFET NMOS or a p-type MOSFET PMOS.

Moreover, each of the first switch M1 to the 18-th switch M18 may be implemented as an oxide thin-film transistor or a low-temperature polysilicon (LTPS) thin-film transistor.

The first switch M1 has a first electrode connected to the high-potential driving voltage line transmitting the high-potential driving voltage VDD, a gate electrode connected to the first carry line Carry1 transmitting the (n−2)-th carry signal Carry[n−2], and a second electrode connected to the second switch M2. One of the first electrode and the second electrode may act as a source electrode, while the other of the first electrode and the second electrode may act as a drain electrode.

The second switch M2 has a first electrode connected to the first switch M1, a gate electrode connected to the first carry line Carry1 transmitting the (n−2)-th carry signal Carry[n−2], and a second electrode connected to the Q node. One of the first electrode and the second electrode may act as a source electrode, while the other of the first electrode and the second electrode may act as a drain electrode.

The third switch M3 has a first electrode connected to the high-potential driving voltage line transmitting the high-potential driving voltage VDD, a gate electrode connected to the first carry line Carry1 transmitting the (n−2)-th carry signal Carry[n−2], and a second electrode connected to the Q node. One of the first electrode and the second electrode may act as a source electrode, while the other of the first electrode and the second electrode may act as a drain electrode.

The fourth switch M4 has a first electrode connected to the high-potential driving voltage line transmitting a high-potential driving voltage VDD, a gate electrode connected to a connection point between the first switch M1 and the second switch M2, and a second electrode connected to the Q node. One of the first electrode and the second electrode may act as a source electrode, while the other of the first electrode and the second electrode may act as a drain electrode.

The fifth switch M5 has a first electrode connected to the high-potential driving voltage line transmitting a high-potential driving voltage VDD, a gate electrode connected to the Q node, and a second electrode connected to the connection point between the first switch M1 and the second switch M2. One of the first electrode and the second electrode may act as a source electrode, while the other of the first electrode and the second electrode may act as a drain electrode.

The sixth switch M6 has a first electrode connected to the high-potential driving voltage line transmitting a high-potential driving voltage VDD, a gate electrode connected to the Q node, and a second electrode connected to a connection point between the 13-th switch M13 and the 14-th switch M14. One of the first electrode and the second electrode may act as a source electrode, while the other of the first electrode and the second electrode may act as a drain electrode.

The seventh switch M7 has a first electrode connected to the Q node, a gate electrode connected to the second carry line Carry2 transmitting the (n+2)-th carry signal Carry[n+2], and a second electrode connected to the eighth switch M8. One of the first electrode and the second electrode may act as a source electrode, while the other of the first electrode and the second electrode may act as a drain electrode.

The eighth switch M8 has a first electrode connected to the seventh switch M7, a gate electrode connected to the second carry line Carry2 transmitting the (n+2)-th carry signal Carry[n+2], and a second electrode connected to the low-potential driving voltage line that transmits the low-potential driving voltage VSS. One of the first electrode and the second electrode may act as a source electrode, while the other of the first electrode and the second electrode may act as a drain electrode.

The ninth switch M9 has both a first electrode and a gate electrode connected to a high-potential driving voltage line which transmit a high-potential driving voltage VDD, and a second electrode connected to the tenth switch M10 and the 11-th switch M11. One of the first electrode and the second electrode may act as a source electrode, while the other of the first electrode and the second electrode may act as a drain electrode.

The tenth switch M10 has a first electrode connected to the ninth switch M9 and the tenth switch M10, a gate electrode connected to the Q node, and a second electrode connected to the low-potential driving voltage line transmitting the low-potential driving voltage VSS. One of the first electrode and the second electrode may act as a source electrode, while the other of the first electrode and the second electrode may act as a drain electrode.

The 11-th switch M11 has a first electrode connected to the high-potential driving voltage line transmitting a high-potential driving voltage VDD, a gate electrode connected to the ninth switch M9 and the tenth switch M10, and a second electrode connected to the QB node. One of the first electrode and the second electrode may act as a source electrode, while the other of the first electrode and the second electrode may act as a drain electrode.

The 12-th switch M12 has a first electrode connected to the QB node, a gate electrode connected to the Q node, and a second electrode connected to the low-potential driving voltage line transmitting the low-potential driving voltage VSS. One of the first electrode and the second electrode may act as a source electrode, while the other of the first electrode and the second electrode may act as a drain electrode.

The 13-th switch M13 has a first electrode connected to a connection point of the sixth switch M6 and the 14-th switch M14, a gate electrode connected to the QB node, and a second electrode connected to the low-potential driving voltage line transmitting the low-potential driving voltage VSS. One of the first electrode and the second electrode may act as a source electrode, while the other of the first electrode and the second electrode may act as a drain electrode.

The 14-th switch M14 has a first electrode connected to the Q node, a gate electrode connected to the QB node, and a second electrode connected to a connection point of the sixth switch M6 and the 13-th switch M13. One of the first electrode and the second electrode may act as a source electrode, while the other of the first electrode and the second electrode may act as a drain electrode.

The 15-th switch M15 has a first electrode connected to the clock signal line transmitting the clock signal CLK, a gate electrode connected to the Q node, and a second electrode connected to the carry output line Carry[n]. One of the first electrode and the second electrode may act as a source electrode, while the other of the first electrode and the second electrode may act as a drain electrode.

A capacitor CBC may be connected to and disposed between the gate electrode and the second electrode of the 15-th switch M15.

The 16-th switch M16 has a first electrode connected to the carry output line Carry[n], a gate electrode connected to the QB node, and a second electrode connected to the low-potential driving voltage line that transmits the low-potential driving voltage VSS. One of the first electrode and the second electrode may act as a source electrode, while the other of the first electrode and the second electrode may act as a drain electrode.

The 17-th switch M17 has a first electrode connected to the clock signal line transmitting the clock signal CLK, a gate electrode connected to the Q node, and a second electrode connected to scan output line Scan[n]. One of the first electrode and the second electrode may act as a source electrode, while the other of the first electrode and the second electrode may act as a drain electrode.

A capacitor CBS may be connected to and disposed between the gate electrode and the second electrode of the 17-th switch M17.

The 18-th switch M18 has a first electrode connected to the scan output line Scan[n], a gate electrode connected to the QB node, and a second electrode connected to the low-potential driving voltage line that transmits the low-potential driving voltage VSSL. One of the first electrode and the second electrode may act as a source electrode, while the other of the first electrode and the second electrode may act as a drain electrode.

In the stage STk 60 of the above configuration, during the pre-charge period, the clock signal CLK is at a low-level, and the (n−2)-th carry signal Carry[n−2] has a high-level, such that the first switch M1 to the third switch M3 are turned on.

Therefore, the high-potential driving voltage VDD is applied to the Q node through the first switch M1 to the third switch M2, such that the voltage of the Q node becomes the voltage (VDD−$V_{TH}$) obtained by subtracting the threshold voltage $V_{TH}$ from the high-potential driving voltage VDD. At this time, the QB node is in a low-level state.

Subsequently, during the boot-strapping period, the clock signal CLK is at a high-level, each of the (n−2)-th carry signal Carry[n−2] and the (n+2)-th carry signal Carry[n+2] is at a low-level, and the Q node is at a high-level, such that the 15-th switch M15 and the 17-th switch M17 are turned on.

Therefore, the high-level clock signal CLK is output to the scan output line Scan[n] and the carry output line Carry[n] through the 15-th switch M15 and the 17-th switch M17, respectively, and thus each of the scan output line Scan[n] and the carry output line Carry[n] becomes a high-level state.

At this time, the voltage of the Q node connected to the gate electrode of each of the 15-th switch M15 and the 17-th switch M17 becomes the voltage (2VDD−$V_{TH}$) obtained by subtracting the threshold voltage $V_{TH}$ from two times of the high-potential driving voltage 2VDD. The QB node is in a low-level state. That is, the QB node is in a low-level state both during the pre-charge period and the boot-strapping period.

In one example, during the pull-down period, the clock signal CLK is at a low-level, and the (n−2)-th carry signal Carry[n−2] has a low-level, and the (n+2)-th carry signal Carry[n+2] has a high-level, so that the seventh switch M7 and the eighth switch M8 are turned on.

Accordingly, the low-potential driving voltage VSS is applied to the Q node via each of the seventh switch M7 and the eighth switch M8 through the low-potential driving voltage (VSS) line connected to the second electrode of each of the seventh switch M7 and the eighth switch M8. Thus, the tenth switch M10 and the 12-th switch M12 are turned on.

At this time, the low-potential driving voltage VSS is applied to the QB node via the 12-th switch M12, such that the QB node becomes a high-level state. Accordingly, the 16-th switch M16 and the 18-th switch M18 are turned on.

Therefore, the low-potential driving voltage VSS/VSSL is output to the scan output line Scan[n] and the carry output line Carry[n] via the 16-th switch M16 and the 18-th switch M18, respectively, so that the each of the scan output line Scan[n] and the carry output line Carry[n] becomes a low-level state.

As described above, one stage STk 60 in the gate driver 30 according to an exemplary embodiment of the present disclosure may adjust the waveform of the output signal via adjustment of the waveform of the carry input signal. That is, the applied clock signal is not changed.

Figure 14:
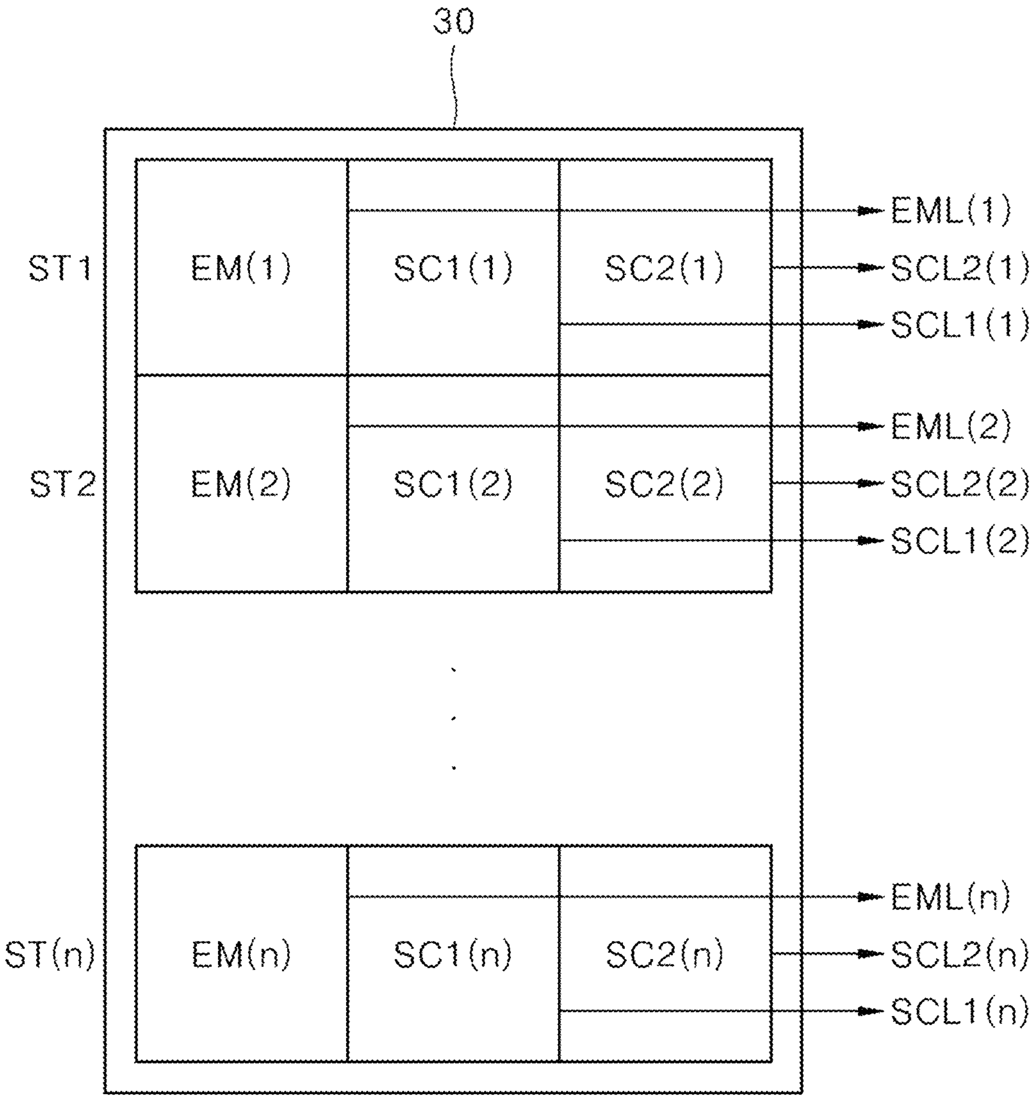
FIG. 14 is a diagram of a stage of a gate driver included in a display device according to an exemplary embodiment of the present disclosure.

FIG. 14 is a diagram of a stage of a gate driver included in a display device according to an exemplary embodiment of the present disclosure.

Referring to FIG. 14, in the gate driver 30 including a light-emission control signal driver, a first scan driver, and a second scan driver, stages ST1 to STn of the shift register may include first scan signal generators SC1(1) to SC1(*n*), second scan signal generators SC2(1) to SC2(*n*), and light-emission control signal generators EM(1) to EM(n), respectively. In one example, the first stage ST1 of the shift register may include the first scan signal generator SC1(1) outputting a first scan signal SC1(1), the second scan signal generator SC2(1) outputting a second scan signal SC2(1), and the light-emission control signal generator EM(1) that outputs an emitting control signal EM(1).

The first scan signal generators SC1(1) to SC1(*n*) respectively output the first scan signals SC1(1) to SC1(*n*) via the first scan lines SCL1 of the display panel 10. The second scan signal generators SC2(1) to SC2(*n*) respectively output the second scan signals SC2(1) to SC2(*n*) via the second scan lines SCL2 of the display panel 10. The light-emission control signal generators EM(1) to EM(n) respectively output the light-emission control signals EM(1) to EM(n) via the light-emission control lines EML of the display panel 10.

The first scan signals SC1(1) to SC1(*n*) may be used as signals for driving a A-th transistor (e.g., a switching transistor) included in the pixel. The second scan signals SC2(1) to SC2(*n*) may be used as signals for driving a B-th transistor (e.g., a sensing transistor) included in the pixel.

The light-emission control signals EM(1) to EM(n) may be used as signals for driving a C-th transistor (e.g., a transistor for controlling light emission) included in the pixel. For example, when the light-emission control signals EM(1) to EM(n) are used to control the transistors for controlling the light emission of the pixel, a light-emission time of the light-emitting element is varied.

FIG. 14 is an example, and the number (SC1 to SC4) or the arrangement of the gate drivers (or the scan drivers) is not limited thereto.

Figure 15:
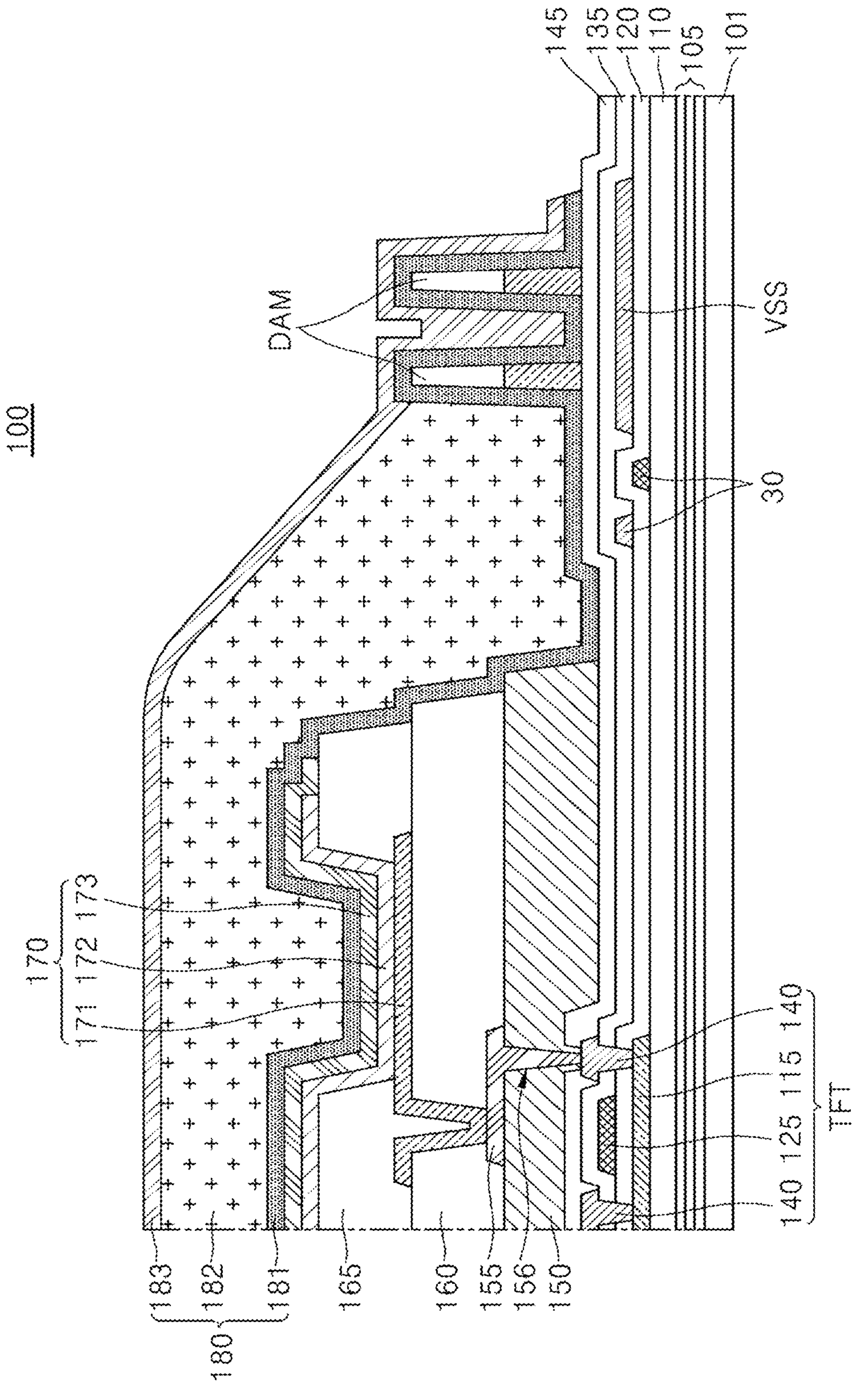
FIG. 15 is a cross-sectional view showing a stack form of a display device according to an exemplary embodiment of the present disclosure.

FIG. 15 is a cross-sectional view showing a stack form of the display device 100 according to an exemplary embodiment of the present disclosure.

Referring to FIG. 15, a thin-film transistor TFT for driving a light-emitting element 170 may be disposed in a display area AA and on a substrate 101. The thin-film transistor TFT may include a semiconductor layer 115, a gate electrode 125, and source/drain electrodes 140. The thin-film transistor TFT may act as the driving transistor. For convenience of illustration, only the driving transistor among various thin-film transistors that may be included in the display device 100 is shown. However, other thin-film transistors such as switching transistors may also be included in the display device 100. Moreover, in the present disclosure, an example in which the thin-film transistor TFT has a coplanar structure is described. However, the thin-film transistor may be implemented to have another structure such as a staggered structure. However, the present disclosure is not limited thereto.

The driving transistor DT may receive the high-potential driving voltage EVDD in response to the data signal supplied to the gate electrode 125 of the driving transistor to control the current amount supplied to the light-emitting element 170 to adjust an amount of light emitted from the light-emitting element 170. The driving transistor may supply a constant current based on a voltage charged in a storage capacitor (not shown) to maintain light emission of the light-emitting element 170 until a data signal of the next frame is supplied. The high-potential supply line may extend in a parallel manner to the data line.

As shown in FIG. 15, the thin-film transistor TFT includes the semiconductor layer 115 disposed on a first insulating layer 110, the gate electrode 125 overlapping the semiconductor layer 115 while a second insulating layer 120 is interposed therebetween, and the source/drain electrodes 140 formed on a third insulating layer 135 and contacting the semiconductor layer 115.

The semiconductor layer 115 may act as an area where a channel is formed during an operation of the thin-film transistor TFT. The semiconductor layer 115 may be made of an oxide semiconductor, or may be made of various organic semiconductors such as amorphous silicon (a-Si), polycrystalline silicon (poly-Si), or pentacene. The present disclosure is not limited thereto. The semiconductor layer 115 may be formed on the first insulating layer 110. The semiconductor layer 115 may include a channel area, a source area, and a drain area. The channel area may overlap with the gate electrode 125 while the first insulating layer 110 is interposed therebetween. The channel area may be formed between the source/drain electrodes 140. The source area may be electrically connected to the source electrode 140 via a contact hole extending through the second insulating layer 120 and the third insulating layer 135. The drain area may be electrically connected to the drain electrode 140 via a contact hole extending through the second insulating layer 120 and the third insulating layer 135. A buffer layer 105 and the first insulating layer 110 may be disposed between the semiconductor layer 115 and a substrate 101. The buffer layer 105 may delay diffusion of moisture and/or oxygen invading into the substrate 101. The first insulating layer 110 may protect the semiconductor layer 115 and may block various types of defects introduced from the substrate 101.

The uppermost layer of the buffer layer 105 in contact with the first insulating layer 110 may be made of a material having different etching characteristics from those of each of the remaining layers of the buffer layer 105, the first insulating layer 110, the second insulating layer 120 and the third insulating layer 135. The uppermost layer of the buffer layer 105 contacting the first insulating layer 110 may be made of one of silicon nitride ($SiN_x$) and silicon oxide ($SiO_x$). Each of the remaining layers of the buffer layer 105, the first insulating layer 110, the second insulating layer 120, and the third insulating layer 135 may be made of the other of silicon nitride ($SiN_x$) and silicon oxide ($SiO_x$). For example, the uppermost layer of the buffer layer 105 in contact with the first insulating layer 110 may be made of silicon nitride ($SiN_x$), while each of the remaining layers of the buffer layer 105, the first insulating layer 110, the second insulating layer 120, and the third insulating layer 135 may be made of silicon oxide ($SiO_x$). The present disclosure is not limited thereto.

The gate electrode 125 may be formed on the second insulating layer 120 and may overlap the channel area of the semiconductor layer 115 while the second insulating layer 120 is interposed therebetween. The gate electrode 125 may be made of a first conductive material and may be embodied as a single layer or multi-layers made of magnesium (Mg), molybdenum (Mo), aluminum (Al), chromium (Cr), gold (Au), titanium (Ti), nickel (Ni), neodymium (Nd), copper (Cu), or an alloy thereof. The present disclosure is not limited thereto.

The source electrode 140 may be connected to the exposed source area of the semiconductor layer 115 via the contact hole extending through the second insulating layer 120 and the third insulating layer 135. The drain electrode 140 may be opposite to the source electrode 140 and may be connected to the drain area of the semiconductor layer 115 via the contact hole extending through the second insulating layer 120 and the third insulating layer 135. Each of the source and drain electrodes 140 may be made of a second conductive material and may be embodied as a single layer or multi-layers made of molybdenum (Mo), aluminum (Al), chromium (Cr), gold (Au), titanium (Ti), nickel (Ni), neodymium (Nd), copper (Cu), or an alloy thereof. The present disclosure is not limited thereto.

A connection electrode 155 may be disposed between a first middle layer 150 and a second middle layer 160. The connection electrode 155 may be connected to the drain electrode 140 via a connection electrode contact hole 156 extending through a protective film/layer 145 and the first middle layer 150. The connection electrode 155 may be made of a material having low resistivity and identical to or similar to that of the drain electrode 140. The present disclosure is not limited thereto.

Referring to FIG. 15, the light-emitting element 170 including the light-emitting layer 172 may be disposed on the second middle layer 160 and a bank layer 165. The light-emitting element 170 may include the anode electrode 171, at least one light-emitting layer 172 formed on the anode electrode 171, and the cathode electrode 173 formed on the light-emitting layer 172.

The anode electrode 171 may be electrically connected to an exposed portion of the connection electrode 155 via a contact hole extending through the second middle layer 160 disposed on the first middle layer 150.

The anode electrode 171 of each pixel is not covered with the bank layer 165 so as to be exposed. The bank layer 165 may be made of an opaque material (e.g., black) to prevent or at least reduce light interference between adjacent pixels. In this case, the bank layer 165 may include a light-shielding material including at least one of color pigment, organic black, and carbon black. The present disclosure is not limited thereto.

Referring to FIG. 15, the at least one light-emitting layer 172 may be formed on a portion of the anode electrode 171 corresponding to a light-emitting area defined by the bank layer 165. The at least one light-emitting layer 172 may include a hole transport layer, a hole injection layer, a hole blocking layer, a light-emitting layer 172, an electron injection layer, an electron blocking layer, and an electron transport layer on the anode electrode 171. A stacking order of the hole transport layer, the hole injection layer, the hole blocking layer, the light-emitting layer 172, the electron injection layer, the electron blocking layer, and the electron transport layer may be based on a light-emitting direction. In addition, the light-emitting layer 172 may include first and second light-emitting stacks facing each other while a charge generating layer is interposed therebetween. In this case, the light-emitting layer 172 of one of the first and second light-emitting stacks may generate blue light, while the light-emitting layer 172 of the other of the first and second light-emitting stacks may generate yellow-green light, so that white light may be generated from a combination of the first and second light-emitting stacks. The white light generated from the combination of the first and second light-emitting stacks may be incident on a color filter positioned above or below the light-emitting layer 172, such that a color image may be realized. In another example, each light-emitting layer 172 may generate each color light corresponding to each pixel without a separate color filter such that a color image may be rendered. For example, the light-emitting layer 172 of a red (R) pixel emits red light, the light-emitting layer 172 of a green (G) pixel emits green light, and the light-emitting layer 172 of a blue (B) pixel emits blue light.

Referring to FIG. 15, the cathode electrode 173 may be formed to face the anode electrode 171 while the light-emitting layer 172 is disposed therebetween, and may receive the high-potential driving voltage EVDD.

An encapsulation layer 180 may block or at least reduce penetration of external moisture or oxygen into the light-emitting element 170 that is vulnerable to external moisture or oxygen. To this end, the encapsulation layer 180 may include at least one inorganic encapsulation layer and at least one organic encapsulation layer. The present disclosure is not limited thereto. In the present disclosure, a structure of the encapsulation layer 180 in which a first encapsulation layer 181, a second encapsulation layer 182, and a third encapsulation layer 183 are sequentially stacked on a substrate 101 is described by way of example.

The substrate 101 may include glass, plastic, or a flexible polymer film. For example, the flexible polymer film may be made of any one of polyimide (PI), polyethylene terephthalate (PET), acrylonitrile-butadiene-styrene copolymer (ABS), polymethyl methacrylate (PMMA), polyethylene naphthalate (PEN), polycarbonate (PC), polyethersulfone (PES), polyarylate (PAR), polysulfone (PSF), or cyclic-olefin copolymer, cyclic olefin copolymer (COC), triacetylcellulose (TAC) film, polyvinyl alcohol (PVA) film, and polystyrene (PS), and the present disclosure is not limited thereto.

The first encapsulation layer 181 is formed on the substrate 101 on which the cathode electrode 173 has been formed. The third encapsulation layer 183 is formed on the substrate 101 on which the second encapsulation layer 182 has been formed. The third encapsulation layer 183 and the first encapsulation layer 181 may surround a top face, a bottom face and a side face of the second encapsulation layer 182. The first encapsulation layer 181 and the third encapsulation layer 183 may minimize or prevent penetration of external moisture or oxygen into the light-emitting element 170. Each of the first encapsulation layer 181 and the third encapsulation layer 183 may be made of an inorganic insulating material that may be deposited at a low temperature, such as silicon nitride ($SiN_x$), silicon oxide ($SiO_x$), silicon oxynitride (SiON), or aluminum oxide ($Al_2O_3$). Each of the first encapsulation layer 181 and the third encapsulation layer 183 is deposited in a low temperature atmosphere. Thus, during a deposition process of the first encapsulation layer 181 and the third encapsulation layer 183, the light-emitting element 170 which is vulnerable to a high-temperature atmosphere may be prevented from being damaged.

The second encapsulation layer 182 serves as a shock-absorbing layer to relieve a stress between layers due to bending of the display device 100, and may planarize a step between layers. The second encapsulation layer 182 may be made of a non-photosensitive organic insulating material such as acryl resin, epoxy resin, phenolic resin, polyamide resin, polyimide resin, polyethylene or silicon oxycarbon (SiOC) or a photosensitive organic insulating material such as photoacryl. The present disclosure is not limited thereto. When the second encapsulation layer 182 is formed using an inkjet method, a dam DAM may be disposed to prevent the second encapsulation layer 182 in a liquid state from spreading to an edge of the substrate 101. The dam DAM may be closer to the edge of the substrate 101 than the second encapsulation layer 182 may be. The dam DAM may prevent the second encapsulation layer 182 in the liquid state from spreading to a pad area where a conductive pad disposed at the outermost side of the substrate 101 is disposed.

The dam DAM is designed to prevent or at least reduce diffusion of the second encapsulation layer 182. However, when the second encapsulation layer 182 overflows the dam DAM during a process, the second encapsulation layer 182 as an organic layer may be exposed to an outside, so that moisture or the like may invade the light-emitting element. Therefore, to prevent the invasion, at least eight or more dams DAM may be stacked.

Referring to FIG. 15, the dam DAM may be disposed on the protective film/layer 145 and in the non-display area NA.

Further, the dam DAM, and the first middle layer 150 and the second middle layer 160 may be formed simultaneously. The first middle layer 150, and a lower layer of the dam DAM may be formed simultaneously. The second middle layer 160, and an upper layer of the dam DAM may be formed simultaneously. Thus, the dam DAM may have a double layer structure.

Accordingly, the dam DAM may be made of the same material as that of each of the first middle layer 150 and the second middle layer 160. However, the present disclosure is not limited thereto.

Referring to FIG. 15, the dam DAM may overlap the low-potential driving power line VSS. For example, the low-potential driving power line VSS may be formed in a layer under the dam DAM and in the non-display area NA.

The low-potential driving power line VSS and the gate driver 30 in a form of a gate in panel (GIP) may surround a periphery of the display panel. The low-potential driving power line VSS may be located outwardly of the gate driver 30. Further, the low-potential driving power line VSS may be connected to the anode electrode 171 to apply a common voltage thereto. The gate driver 30 is simply illustrated in plan and cross-sectional views. However, the gate driver 30 may be configured using a thin-film transistor TFT having the same structure as that of the thin-film transistor TFT of the display area AA.

Referring to FIG. 15, the low-potential driving power line VSS is disposed outwardly of the gate driver 30. The low-potential driving power line VSS is disposed outwardly of the gate driver 30 and surrounds the display area AA. The low-potential driving power line VSS may be made of the same material as that of each of the source and drain electrodes 140 of the thin-film transistor TFT. The present disclosure is not limited thereto. For example, the low-potential driving power line VSS may be made of the same material as that of the gate electrode 125.

Further, the low-potential driving power line VSS may be electrically connected to the anode electrode 171. The low-potential driving power line VSS may supply the low-potential driving voltage EVSS to the plurality of pixels in the display area AA.

According to the embodiments of the present disclosure, a long time for sensing the threshold voltage of each pixel may be secured. Therefore, the compensation rate for the threshold voltage of each pixel may be increased. Moreover, the number of external clock signals to each pixel in the display panel may not be increased. Moreover, the number of external clock signals to each pixel in the display panel may not be increased such that a thickness of the bezel may be reduced, and a control burden of the timing controller may be reduced.

Further, according to the embodiment of the present disclosure, the method for driving a pixel of the display device may be realized which may be capable of securing a time to sense the threshold voltage of the driving transistor and of compensating for the threshold voltage when a gate driver of the display device applies a scan signal to a pixel of an organic light-emitting diode to drive the pixel.

Although the embodiments of the present disclosure have been described in more detail with reference to the accompanying drawings, the present disclosure is not necessarily limited to these embodiments, and may be modified in a various manner within the scope of the technical spirit of the present disclosure. Accordingly, the embodiments as disclosed in the present disclosure are intended to describe rather than limit the technical idea of the present disclosure, and the scope of the technical idea of the present disclosure is not limited by these embodiments. Therefore, it should be understood that the embodiments described above are not restrictive but illustrative in all respects.

What is claimed is:

1. A display device comprising:

a display panel comprising a plurality of pixels, each of the plurality of pixels including:

a light-emitting element configured to emit light based on a driving current;

a pixel circuit configured to control the driving current, wherein responsive to a first scan signal of a high-level and a second scan signal of a high-level being applied to the pixel circuit in an overlapping manner at a same time, threshold voltage compensation is performed at least twice based on threshold voltage sensing, wherein during an initialization period of the light-emitting element, a third scan signal of a high-level is applied to the pixel circuit while the first scan signal and the second scan signal are of a low-level, and wherein during an initialization period of a driving transistor, each of the first scan signal of the high-level, the second scan signal of the high-level, and the third scan signal of the high-level are applied to the pixel circuit.

2. The display device of claim 1, further comprising:

a gate driver configured to supply a scan signal to each of the plurality of pixels;

a data driver configured to supply a data voltage to each of the plurality of pixels;

a light-emission signal supply configured to supply a light-emission signal to each of the plurality of pixels; and a timing controller configured to control the gate driver, the data driver, and the light-emission signal supply.

3. The display device of claim 2, wherein the pixel circuit includes:

a driving transistor configured to control the driving current, and including a first electrode as a first node, a gate electrode as a second node, and a second electrode as a third node;

a first transistor including a first gate electrode connected to a first scan signal line transmitting a first scan signal;

a second transistor including a second gate electrode connected to a second scan signal line transmitting a second scan signal;

a third transistor including a third gate electrode connected to a third scan signal line transmitting a third scan signal;

a fourth transistor including a fourth gate electrode connected to a fourth scan signal line transmitting a fourth scan signal; and a storage capacitor connecting the second node and the third node to each other.

4. The display device of claim 3, wherein the gate driver outputs a clock pulse of a high-level related to each of the first scan signal and the second scan signal at least twice every 3 horizontal periods or more, wherein in each of the plurality of pixels, compensation for a threshold voltage for the pixel is made based on the threshold voltage sensing responsive to the first scan signal having the high-level and the second scan signal having the high-level overlapping each other during a threshold voltage sensing period between an initialization period of the driving transistor and a data input time and mobility sensing period.

5. The display device of claim 4, wherein in each of the plurality of pixels, a compensation rate for the threshold voltage increases as a number of times at which the first scan signal having the high-level and the second scan signal having the high-level overlap each other during the threshold voltage sensing period increases.

6. The display device of claim 3, wherein each of the driving transistor and the first transistor to the fourth transistor is an n-type MOSFET NMOS or a p-type MOSFET PMOS.

7. The display device of claim 3, wherein each of the driving transistor and the first transistor to the fourth transistor is an oxide thin-film transistor, a low-temperature polycrystalline silicon thin-film transistor, or a crystallized silicon c-Si transistor.

8. The display device of claim 3, wherein the first electrode of the driving transistor is connected to a high-potential driving voltage line transmitting a high-potential driving voltage;

the gate electrode of the driving transistor is connected to a second electrode of the second transistor and a first electrode of the storage capacitor; and the second electrode of the driving transistor is connected to a first electrode of the light-emitting element, a first electrode of the third transistor, and a second electrode of the storage capacitor, wherein the first transistor includes:

a first electrode connected to a first reference voltage line transmitting a first reference voltage; and a second electrode connected to a first electrode of the second transistor and a second electrode of the fourth transistor, wherein the second transistor includes:

the first electrode connected to the second electrode of the first transistor and the second electrode of the fourth transistor; and the second electrode connected to the second node and the first electrode of the storage capacitor, wherein the third transistor includes:

the first electrode connected to the third node; and a second electrode connected to a second reference voltage line transmitting a second reference voltage, wherein the fourth transistor includes:

a first electrode connected to a data voltage line transmitting the data voltage; and the second electrode connected to the second electrode of the first transistor and the first electrode of the second transistor.

9. The display device of claim 3, wherein each of the plurality of pixels operates in separate operation periods, wherein the separate operation periods of each pixel include the initialization period of the light-emitting element of the pixel, the initialization period of the driving transistor of the pixel, a threshold voltage sensing period, a data input time and mobility sensing period, and an emission period.

10. The display device of claim 9, wherein during the initialization period of the light-emitting element of the pixel, the third scan signal of high-level is applied to the third gate electrode to turn on the third transistor, and a second reference voltage is applied to an anode electrode of the light-emitting element through the third transistor.

11. The display device of claim 10, wherein the third scan signal of the high-level is applied to the third gate electrode for 2 horizontal periods or more.

12. The display device of claim 9, wherein during the initialization period of the driving transistor, the first scan signal of the high-level is applied to the first gate electrode to turn on the first transistor, the second scan signal of the high-level is applied to the second gate electrode to turn on the second transistor;

the third scan signal of the high-level is applied to the third gate electrode to turn on the third transistor, a first reference voltage is applied to the gate electrode of the driving transistor through the first transistor and the second transistor such that the gate electrode of the driving transistor is initialized by the first reference voltage, and a second reference voltage is applied to a second electrode of the driving transistor through the third transistor such that the second electrode of the driving transistor is initialized by the second reference voltage.

13. The display device of claim 12, wherein the first scan signal of the high-level is applied to the first gate electrode for 1 horizontal period, the second scan signal of the high-level is applied to the second gate electrode for 1 horizontal period, and the third scan signal of the high-level is applied to the third gate electrode for 2 horizontal periods.

14. The display device of claim 9, wherein during the threshold voltage sensing period, the first scan signal of a high-level is applied to the first gate electrode to turn on the first transistor, the second scan signal of a high-level is applied to the second gate electrode to turn on the second transistor, each of the third transistor and the fourth transistor is turned off, a first reference voltage is applied to a gate electrode of the driving transistor through the first transistor and the second transistor, and a voltage of an anode electrode of the light-emitting element has a value based on a difference between a threshold voltage of the driving transistor and the first reference voltage.

15. The display device of claim 14, wherein the threshold voltage sensing period is repeated at least once after a predetermined horizontal period.

16. The display device of claim 15, wherein the threshold voltage sensing period is repeated at least twice after the predetermined horizontal period.

17. The display device of claim 9, wherein during the data input time and mobility sensing period, the second scan signal of a high-level is applied to the second gate electrode to turn on the second transistor, the fourth scan signal of a high-level is applied to the fourth gate electrode to turn on the fourth transistor, the data voltage is applied to the gate electrode of the driving transistor through the fourth transistor and the second transistor, and a voltage of an anode electrode of the light-emitting element is calculated based on a capacitance value of a first capacitor as the storage capacitor, a capacitance value of a second capacitor, the data voltage, and a voltage obtained based on a difference between a threshold voltage and a first reference voltage, wherein the second capacitor is a parasitic light-emitting element capacitor disposed between and connected to a second electrode of the storage capacitor and a cathode electrode of the light-emitting element.

18. The display device of claim 17, the voltage of the anode electrode of the light-emitting element is based on a quotient of a value obtained by multiplying a first capacitance value of the first capacitor and the data voltage by a value obtained by adding the first capacitance and a second capacitance of the second capacitor to each other to produce a first value, subtracting the threshold voltage from the first reference voltage to produce a second value, and then dividing a value obtained by multiplying the second capacitance and the second value by a value obtained by adding the first capacitance and the second capacitance to each other to produce a third value, and then adding the first value and the third value.

19. A method for driving a pixel of a display device, wherein the display device includes a display panel in which a plurality of pixels are disposed, and a gate driver configured to supply a scan signal to each of the plurality of pixels where each of the plurality of pixels includes a light-emitting element configured to emit light based on a driving current, a driving transistor configured to control the driving current, and the driving transistor including a first electrode as a first node, a gate electrode as a second node, and a second electrode as a third node, a first transistor including a first gate electrode connected to a first scan signal line transmitting a first scan signal, and a second transistor including a second gate electrode connected to a second scan signal line transmitting a second scan signal, and a third transistor including a third gate electrode connected to a third scan signal line transmitting a third scan signal, wherein the method comprises:

during a threshold voltage sensing period of each of the plurality of pixels, outputting, by the gate driver, the first scan signal of a high-level and the second scan signal of a high-level simultaneously and in an overlapping manner to each of the plurality of pixels;

applying the first scan signal of the high-level to the first gate electrode to turn on the first transistor, and applying the second scan signal of the high-level to the second gate electrode to turn on the second transistor;

applying a first reference voltage to the gate electrode of the driving transistor through the first transistor and the second transistor; and compensating for a threshold voltage of the driving transistor, wherein during an initialization period of the light-emitting element, applying the third scan signal of the high-level to the third gate electrode of the third transistor while the first scan signal of a low-level is applied to the first gate electrode of the first transistor and the second scan signal of the low-level is applied to the second gate electrode of the second transistor, and wherein during an initialization period of a driving transistor, applying the first scan signal of the high-level to the first gate electrode of the first transistor, the second scan signal of the high-level to the second gate electrode of the second transistor, and the third scan signal of the high-level to the third gate electrode of the third transistor.

20. The method of claim 19, wherein each of the plurality of pixels further includes a fourth transistor including a fourth gate electrode connected to a fourth scan signal line transmitting a fourth scan signal, and a storage capacitor connecting the second node and the third node to each other, wherein outputting the first scan signal comprises the gate driver outputting the third scan signal of a low-level and the fourth scan signal of a low-level to each of the plurality of pixels, the third scan signal of the low-level is applied to the third gate electrode, and the fourth scan signal of the low-level is applied to the fourth gate electrode, such that each of the third transistor and the fourth transistor is turned off during the threshold voltage sensing period.

21. The method of claim 20, wherein the threshold voltage comprises a voltage difference across the storage capacitor.

22. The method of claim 19, wherein a voltage of an anode electrode of the light-emitting element has a value based on a difference between the threshold voltage of the driving transistor and the first reference voltage during the compensation of the threshold voltage.

23. The method of claim 20, wherein data voltage is applied to the gate electrode of the driving transistor through the fourth transistor and the second transistor, and wherein during the compensation of the threshold voltage, a voltage of an anode electrode of the light-emitting element has a value based on a capacitance value of a first capacitor as the storage capacitor, a capacitance value of a second capacitor, the data voltage, and a voltage obtained by subtracting a threshold voltage from a first reference voltage, wherein the second capacitor is a parasitic light-emitting element capacitor disposed between and connected to a second electrode of the storage capacitor and a cathode electrode of the light-emitting element.

24. The display device of claim 23, the voltage of the anode electrode of the light-emitting element is based on a quotient of a value obtained by multiplying a first capacitance value of the first capacitor and the data voltage by a value obtained by adding the first capacitance and a second capacitance of the second capacitor to each other to produce a first value, subtracting the threshold voltage from the first reference voltage to produce a second value, and then dividing a value obtained by multiplying the second capacitance and the second value by a value obtained by adding the first capacitance and the second capacitance to each other to produce a third value, and then adding the first value and the third value.

* * * * *